US011871360B2

(12) United States Patent
Deenoo et al.

(10) Patent No.: US 11,871,360 B2
(45) Date of Patent: Jan. 9, 2024

(54) DEVICES, SYSTEMS AND METHODS FOR POWER EFFICIENT BEAM MANAGEMENT IN WIRELESS SYSTEMS

(71) Applicant: INTERDIGITAL PATENT HOLDINGS, INC., Wilmington, DE (US)

(72) Inventors: Yugeswar Deenoo, Chalfont, PA (US); Ghyslain Pelletier, Montreal (CA); Martino M. Freda, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 17/977,455

(22) Filed: Oct. 31, 2022

(65) Prior Publication Data
US 2023/0110121 A1 Apr. 13, 2023

Related U.S. Application Data

(63) Continuation of application No. 16/951,660, filed on Nov. 18, 2020, now Pat. No. 11,528,668, which is a
(Continued)

(51) Int. Cl.
*H04W 52/34* (2009.01)
*H04W 52/02* (2009.01)
(Continued)

(52) U.S. Cl.
CPC ........... *H04W 52/34* (2013.01); *H04W 24/08* (2013.01); *H04W 52/0216* (2013.01);
(Continued)

(58) Field of Classification Search
CPC ..... H04W 52/34; H04W 76/28; H04W 24/08; H04W 52/0216; H04W 72/042; H04W 72/23; Y02D 30/70
See application file for complete search history.

(56) References Cited

U.S. PATENT DOCUMENTS 7,209,749 B2   4/2007  Kwak et al.
7,756,544 B1   7/2010  Graham
(Continued)

FOREIGN PATENT DOCUMENTS

CN          103945504         7/2014

OTHER PUBLICATIONS

Interdigital Communications, "C-DRX Beam Management Aspects," 3GPP TSG-RAN WG2 Meeting #97, R2-1701187, Athens, Greece (Feb. 13-17, 2017).
(Continued)

*Primary Examiner* — Dominic E Rego
(74) *Attorney, Agent, or Firm* — Volpe Koenig

(57) ABSTRACT

A wireless transmit/receive unit (WTRU) is configured to receive a radio resource control (RRC) message. The RRC message may comprise information that indicates an association between each of a plurality of beams and power information. The WTRU is configured to receive a trigger message. The WTRU is configured to select a beam in response to the received trigger message. The WTRU is configured to send a control channel transmission using a power level. The power level may be based on the power information mapped to the selected beam.

20 Claims, 12 Drawing Sheets

Related U.S. Application Data continuation of application No. 16/346,785, filed as application No. PCT/US2017/058739 on Oct. 27, 2017, now abandoned.

(60) Provisional application No. 62/416,622, filed on Nov. 2, 2016.

(51) Int. Cl.
  H04W 76/28 (2018.01)
  H04W 24/08 (2009.01)
  H04W 72/23 (2023.01)

(52) U.S. Cl.
  CPC ........... H04W 72/23 (2023.01); H04W 76/28 (2018.02); Y02D 30/70 (2020.08)

(56) References Cited

U.S. PATENT DOCUMENTS

| | | | |
|---|---|---|---|
| 8,818,442 | B2 | 8/2014 | Seo et al. |
| 9,426,621 | B2* | 8/2016 | Venkatraman ........ H04W 4/023 |
| 10,158,173 | B2 | 12/2018 | Foo |
| 10,425,897 | B2 | 9/2019 | Choi et al. |
| 10,575,322 | B2 | 2/2020 | Lee et al. |
| 10,630,355 | B2 | 4/2020 | Faxer et al. |
| 10,931,342 | B2 | 2/2021 | Noh et al. |
| 11,588,598 | B2* | 2/2023 | Lee ..................... H04L 5/0048 |
| 2013/0321206 | A1 | 12/2013 | Chang |
| 2013/0343338 | A1 | 12/2013 | Campos et al. |
| 2014/0169322 | A1* | 6/2014 | Ouchi ................. H04W 52/146 |
| | | | 370/329 |
| 2015/0007190 | A1 | 1/2015 | Diefenbaugh et al. |
| 2015/0078189 | A1 | 3/2015 | Kwon et al. |
| 2015/0215944 | A1 | 7/2015 | Kim et al. |
| 2015/0222399 | A1* | 8/2015 | Cheng .................. H04W 48/08 |
| | | | 370/329 |
| 2015/0359004 | A1* | 12/2015 | Xu ....................... H04B 17/309 |
| | | | 370/329 |
| 2016/0037452 | A1 | 2/2016 | Kim et al. |
| 2016/0088660 | A1* | 3/2016 | Liu ....................... H04L 5/0005 |
| | | | 370/252 |
| 2016/0191176 | A1 | 6/2016 | O'Keeffe et al. |
| 2016/0197660 | A1 | 7/2016 | O'Keeffe et al. |
| 2016/0205601 | A1* | 7/2016 | Yiu ................... H04W 72/0466 |
| | | | 455/444 |
| 2016/0227548 | A1* | 8/2016 | Nimbalker ............ H04L 1/0039 |
| 2016/0254869 | A1* | 9/2016 | Wen ..................... H04L 5/0073 |
| | | | 370/330 |
| 2016/0262158 | A1 | 9/2016 | Chen et al. |
| 2017/0251518 | A1 | 8/2017 | Agiwal et al. |
| 2017/0331577 | A1 | 11/2017 | Parkvall et al. |
| 2017/0331670 | A1 | 11/2017 | Parkvall et al. |
| 2017/0332283 | A1* | 11/2017 | Kubota ............. H04W 36/0069 |
| 2018/0020487 | A1 | 1/2018 | Tsai et al. |
| 2018/0034611 | A1 | 2/2018 | Nagaraja et al. |
| 2018/0035451 | A1* | 2/2018 | Krishnamoorthi .... H04W 72/12 |
| 2018/0041261 | A1 | 2/2018 | Modarres Razavi et al. |
| 2018/0063881 | A1* | 3/2018 | Shah ..................... H04W 76/19 |
| 2018/0103433 | A1 | 4/2018 | Li et al. |
| 2019/0103931 | A1 | 4/2019 | Yi et al. |
| 2019/0182817 | A1 | 6/2019 | Agiwal et al. |
| 2019/0222403 | A1* | 7/2019 | Behravan ............. H04L 5/0035 |

OTHER PUBLICATIONS

Interdigital Communications, "Paging Aspects for Multi-beam Operation," 3GPP TSG-RAN WG2 Meeting #97, R2-1701193, Athens, Greece (Feb. 13-17, 2017).

Interdigital Communications, "Paging in High Frequency," 3GPP TSG-RAN WG2 #97bis, R2-1702879, Spokane, Washington (Apr. 3-7, 2017).

Kwon et al., "Performance Analysis of DRX Mechanism Considering Analogue Beamforming in Millimeter-Wave Mobile Broadband System," IEEE Globecom Workshops, pp. 802-807 (Dec. 2014).

LG Electronics, Inc., "On-demand paging in RRC_IDLE," 3GPP TSG-RAN WG2 NR Ad Hoc, R2-1700443, Spokane, USA (Jan. 17-19, 2017).

Nokia et al., "Paging in NR at HF operation," 3GPP TSG-RAN WG2 NR Adhoc, R2-1700062, Spokane, USA (Jan. 17-19, 2017).

Samsung, "C-DRX Operations considering Beamforming," 3GPP TSG-RAN WG2 2017 NR Ad-hoc Meeting, R2-1700595, Spokane, USA (Jan. 17-19, 2017).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 13)," 3GPP TS 36.300 V13.3.0 (Mar. 2016).

Third Generation Partnership Project, "Technical Specification Group Radio Access Network; Evolved Universal Terrestrial Radio Access (E-UTRA) and Evolved Universal Terrestrial Radio Access etwork (E-UTRAN); Overall description; Stage 2 (Release 14)," 3GPP TS 36.300 V14.0.0 (Sep. 2016).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 14)," 3GPP TS 36.300 V14.4.0 (Sep. 2017).

Third Generation Partnership Project, "Technical Specification Group Radio Access Network; Evolved Universal Terrestrial Radio Access (E-UTRA); Physical layer procedures (Release 13)," 3GPP TS 36.213 V13.2.0 (Jun. 2016).

Third Generation Partnership Project, "Technical Specification Group Radio Access Network; Evolved Universal Terrestrial Radio Access (E-UTRA); Physical layer procedures (Release 14)," 3GPP TS 36.213 V14.0.0 (Sep. 2016).

Third Generation Partnership Project, "Technical Specification Group Radio Access Network; Evolved Universal Terrestrial Radio Access (E-UTRA); Physical layer procedures (Release 14)," 3GPP TS 36.213 V14.4.0 (Sep. 2017).

Third Generation Partnership Project, "Technical Specification Group Radio Access Network; Evolved Universal Terrestrial Radio Access (E-UTRA); Medium Access Control (MAC) protocol specification (Release 13)," 3GPP TS 36.321 V13.1.0 (Mar. 2016).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.0.0 (Sep. 2016).

Third Generation Partnership Project, "Technical Specification Group Radio Access Network; Evolved Universal Terrestrial Radio Access (E-UTRA); Medium Access Control (MAC) protocol specification (Release 14)," 3GPP TS 36.321 V14.4.0 (Sep. 2017).

Third Generation Partnership Project, "Technical Specification Group Radio Access Network; Evolved Universal Terrestrial Radio Access (E-UTRA); Radio Resource Control (RRC); Protocol specification (Release 13)," 3GPP TS 36.331 V13.1.0 (Mar. 2016).

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.0.0 (Sep. 2016).

Third Generation Partnership Project, "Technical Specification Group Radio Access Network; Evolved Universal Terrestrial Radio Access (E-UTRA); Radio Resource Control (RRC); Protocol specification (Release 14)," 3GPP TS 36.331 V14.4.0 (Sep. 2017).

Third Generation Partnership Project, "Technical Specification Group Radio Access Network; NR; Physical layer procedures for control (Release 15)," 3GPP TS 38.213 V1.0.0 (Sep. 2017).

Third Generation Partnership Project, "Technical Specification Group Radio Access Network; NR; Medium Access Control (MAC) protocol specification (Release 15)," 3GPP TS 38.321 V1.0.0 (Sep. 2017).

Third Generation Partnership Project, "Technical Specification Group Radio Access Network; NR; Radio Resource Control (RRC); Protocol specification (Release 15)," 3GPP TS 38.331 V0.1.0 (Oct. 2017).

(56) References Cited

OTHER PUBLICATIONS

Third Generation Partnership Project, "Technical Specification Group Radio Access Network; Evolved Universal Terrestrial Radio Access (E-UTRA); User Equipment (UE) procedures in idle mode (Release 14)," 3GPP TS 36.304 V14.0.0 (Sep. 2016).
Third Generation Partnership Project, "Technical Specification Group Radio Access Network; Evolved Universal Terrestrial Radio Access (E-UTRA); User Equipment (UE) procedures in idle mode (Release 14)," 3GPP TS 36.304 V14.4.0 (Sep. 2017).
Third Generation Partnership Project, "Technical Specification Group Radio Access Network; Evolved Universal Terrestrial Radio Access (E-UTRA); Physical channels and modulation (Release 14)," 3GPP TS 36.211 V14.0.0 (Sep. 2016).
Third Generation Partnership Project, "Technical Specification Group Radio Access Network; Evolved Universal Terrestrial Radio Access (E-UTRA); Physical channels and modulation (Release 14)," 3GPP TS 36.211 V14.4.0 (Sep. 2017).
Third Generation Partnership Project, "Technical Specification Group Radio Access Network; NR; Physical channels and modulation (Release 15)," 3GPP TS 38.211 V1.0.0 (Sep. 2017).
Third Generation Partnership Project, "Technical Specification Group Radio Access Network; Evolved Universal Terrestrial Radio Access (E-UTRA); Requirements for support of radio resource management (Release 14)," 3GPP TS 36.133 V14.1.0 (Sep. 2016).
Third Generation Partnership Project, "Technical Specification Group Radio Access Network; Evolved Universal Terrestrial Radio Access (E-UTRA); Requirements for support of radio resource management (Release 14)," 3GPP TS 36.133 V14.5.0 (Sep. 2017).
Third Generation Partnership Project, "Technical Specification Group Radio Access Network; Evolved Universal Terrestrial Radio Access (E-UTRA); Requirements for support of radio resource management (Release 15)," 3GPP TS 36.133 V15.0.0 (Sep. 2017).

* cited by examiner

| DRX Parameter | Notation | Value range | Configuring Network node |
|---|---|---|---|
| WTRU specific DRX cycle (NAS signalling) | $T_{WTRU}$ | 32, 64, 128, 256 (in radio frames) | MME |
| Cell Specific DRS cycle (Broadcasting) | $T_c$ | 32, 64, 128, 256 (in radio frames) | eNB, gNB |
| Number of paging occasions per DRX cycle (Broadcasting) | nB | 4T, 2T, T, T/2, T/4, T/8, T/16, T/32 | eNB, gNB |

FIG. 3

| | | |
|---|---|---|
| DRX cycle (paging cycle) of WTRU | T | = min($T_{WTRU}$, $T_c$) in radio frames |
| Number of paging frames within WTRU's DRX cycle | N | Min(T, nB) |
| Number of paging sub frames used for paging within a paging frame | $N_s$ | Max(1, nB/T) |
| Paging Frame Number = SFN mod T = (T/N) * ( WTRU_ID mod N) | | |
| Paging Occasion is a function of i_s, $N_s$ and Predefined sub frame Pattern | | |

FIG. 4

DEVICES, SYSTEMS AND METHODS FOR POWER EFFICIENT BEAM MANAGEMENT IN WIRELESS SYSTEMS

CROSS REFERENCE TO RELATED APPLICATIONS

This application is a continuation of U.S. patent application Ser. No. 16/951,660, filed Nov. 18, 2020, which is a continuation of U.S. patent application Ser. No. 16/346,785, filed May 1, 2019, which is a continuation of the U.S. National Stage, under 35 U.S.C. § 371, of International Application No. PCT/US2017/058739 filed on Oct. 27, 2017, which claims the benefit of U.S. Provisional Application No. 62/416,622 filed Nov. 2, 2016, which are incorporated by reference as if fully set forth.

BACKGROUND

Next generation air interfaces, including further evolution of LTE Advanced Pro and a New Radio (NR) interface, are expected to support wide range of use cases with varying service requirements. These may include low overhead and low data rate power efficient services (mMTC), ultra-reliable low latency services (URLLC), and high data rate mobile broadband services (eMBB).

The next generation air interfaces may also be expected to support diverse user equipment (UE) or wireless transmit/receive unit (WTRU) capabilities. such as low power low bandwidth, very wide bandwidth (e.g., 80 Mhz), and support for high frequencies (e.g., >6 GHz, etc.) under various mobility scenarios (e.g., stationary/fixed, high speed trains, etc.).

In addition, the next generation air interfaces are expected to use an architecture that is flexible enough to adapt to diverse deployment scenarios (e.g., standalone, non-standalone with assistance from a different air interface, centralized, virtualized, and distributed over ideal/non-ideal backhaul, etc.).

However, there may be a lack of interaction between discontinuous reception (DRX) management and beam management. Traditionally, DRX procedures may be designed with data activity in mind. Thus, a focus of DRX management may be to enable power savings when there is no data activity at the UE. On the other hand, beam management may be introduced to ensure that the WTRU and the network are communicating via the best beam pair possible to provide link robustness and high throughput. Thus, beam management involves beam pairing and beam tracking. With NR interfaces, beam management may be introduced to handle beamformed transmissions at higher frequencies.

A potential conflict may arise if DRX management and beam management are optimized separately. For example, optimizing just the power savings (e.g., with longer sleep times) may result in loss of beams or a drop in cell capacity due to non-optimal beams. Similarly, optimizing just the beamforming may lead to increased overhead, reduced sleep times, and increased power consumption.

SUMMARY

Embodiments described herein include systems, apparatuses, and methods for method for jointly performing beam management and power management in a wireless system. One or more embodiments may include coupling a power states implemented by a wireless transmit/receive unit (WTRU) to beam management states and/or procedures of the WTRU.

According to one or more embodiments, a method is provided for jointly performing beam management and power management in a wireless transmit/receive unit (WTRU), where the WTRU is configured to operate according to a plurality of power states and a plurality of beam management states that are linked to the plurality of power states such that each power state corresponds to a different beam management state. The method includes detecting a trigger condition; transitioning the WTRU between a first power state to a second power state based on the detected trigger condition; and transitioning the WTRU between a first beam management state to a second beam management state responsive to the transition to the second power state to which the second beam management state is linked.

According to one or more embodiments, a wireless transmit/receive unit (WTRU) configured to jointly perform beam management and power management is provided. The WTRU includes at least one processor configured to operate according to a plurality of power states and a plurality of beam management states that are linked to the plurality of power states such that each power state corresponds to a different beam management state. The processor is configured to detect a trigger condition, transition between a first power state to a second power state based on the detected trigger condition, and transition between a first beam management state to a second beam management state responsive to the transition to the second power state to which the second beam management state is linked. The WTRU further includes a receiver configured to operate according to the plurality of power states and the plurality of beam management states; and a transmitter configured to operate according to the plurality of power states and the plurality of beam management states.

According to one or more embodiments, another method is provided for jointly performing beam management and power management in a wireless transmit/receive unit (WTRU), where the WTRU is configured to operate according to a plurality of power states and a plurality of beam management states that are linked to the plurality of power states such that each power state corresponds to a different beam management state. The method includes detecting a trigger condition; transitioning the WTRU between a first beam management state to a second beam management state based on the detected trigger condition; and transitioning the WTRU between a first power state to a second power state responsive to the transition to the second beam management state to which the second power state is linked.

According to one or more embodiments, another wireless transmit/receive unit (WTRU) configured to jointly perform beam management and power management is provided. The WTRU includes at least one processor configured to operate according to a plurality of power states and a plurality of beam management states that are linked to the plurality of power states such that each power state corresponds to a different beam management state. The processor is configured to detect a trigger condition, transition between a first beam management state to a second beam management state based on the detected trigger condition, and transition between a first power state to a second power state responsive to the transition to the second beam management state to which the second power state is linked. The WTRU further includes a receiver configured to operate according to the plurality of power states and the plurality of beam management states; and a transmitter configured to operate according to the plurality of power states and the plurality of beam management states.

BRIEF DESCRIPTION OF THE DRAWINGS

Furthermore, like reference numerals in the figures indicate like elements, and wherein:

FIG. 3 is a first table illustrating the derivation of the paging frame and paging occasion based on the WTRU_ID;

FIG. 4 is a second table illustrating the derivation of the paging frame and paging occasion based on the WTRU_ID;

DETAILED DESCRIPTION

Figure 1A:
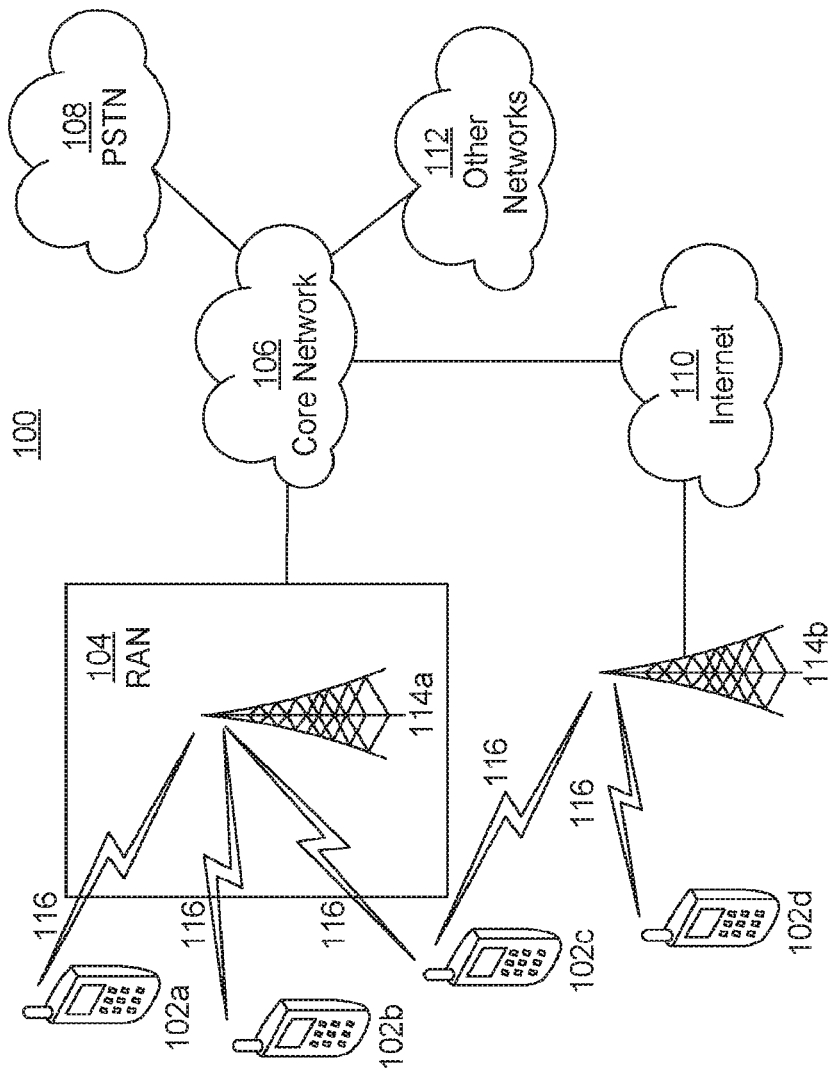
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA-F). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
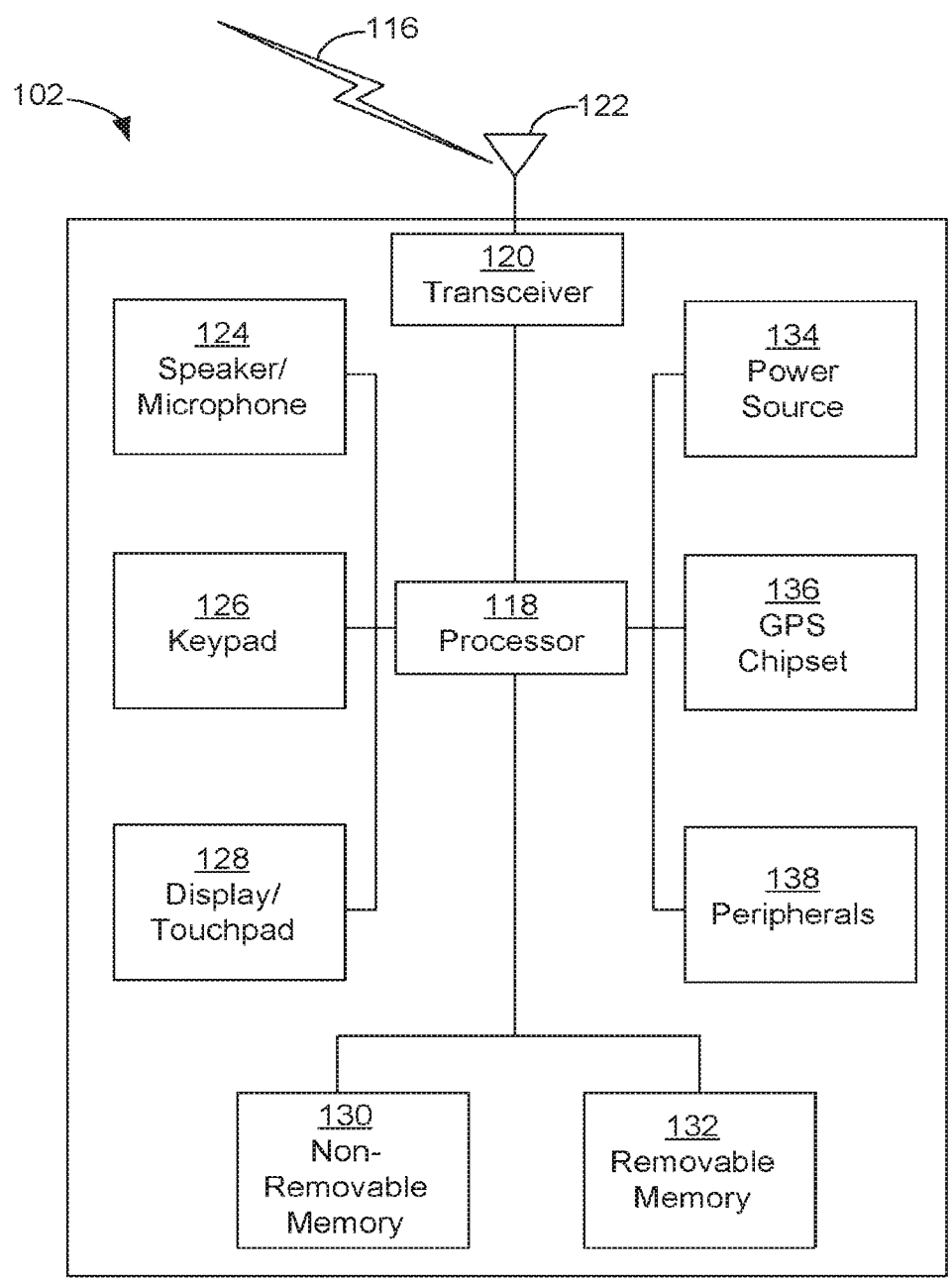
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth™ module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
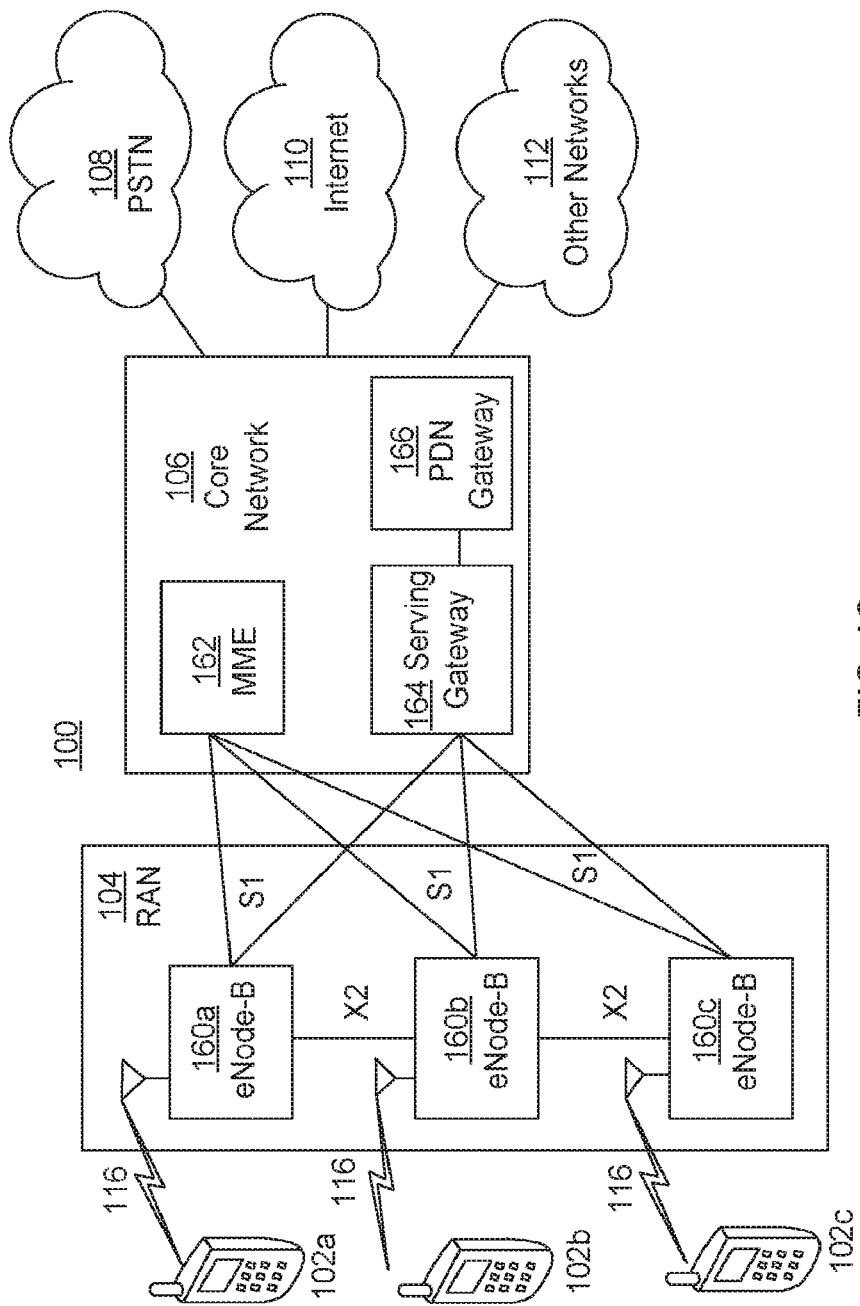
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
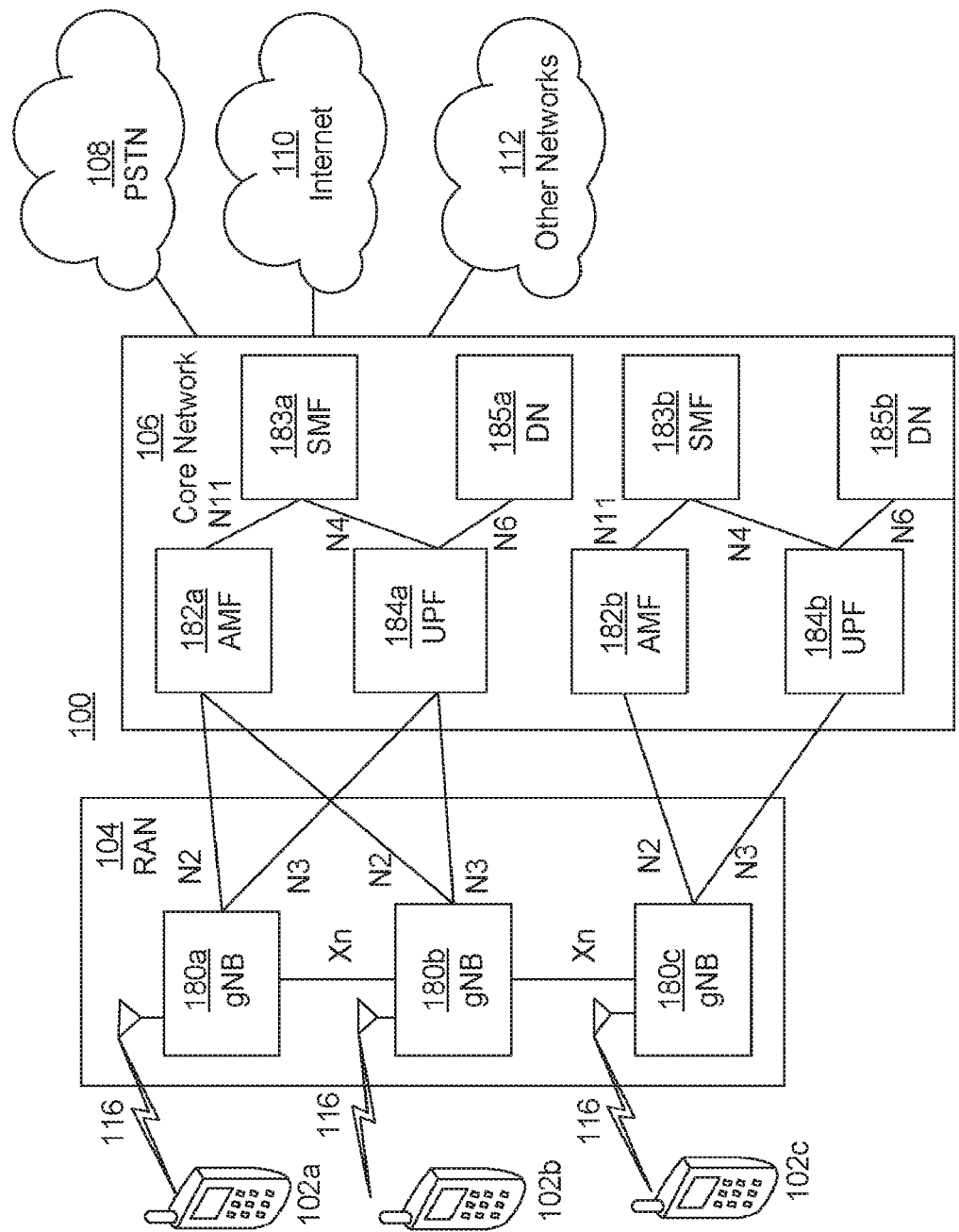
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In the following, details are set forth to provide a more thorough explanation of the embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise. For example, variations or modifications described with respect to one of the embodiments may also be applicable to other embodiments unless noted to the contrary.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

It should be noted that the term network as used hereinafter may refer to one or more base stations (e.g., eNBs and/or gNBs) which in turn may be associated with one or more Transmission/Reception Points (TRPs), including WTRUs, or any other node in a radio access network (RAN).

As described above, the 5G air interface may enable improved broadband performance (IBB), industrial control and communications (ICC) and vehicular applications (V2X), and massive Machine-Type Communications (mMTC). The uses cases may require one or more of the following features.

Support for ultra-low transmission latency (e.g., LLC) may be desired. An air interface latency as low as 1 ms Round-Trip Time (RTT) may require support for TTIs somewhere between 100 us and (no larger than) 250 us. Support for ultra-low access latency (e.g., the time from initial system access until the completion of the transmission of the first user plane data unit) may be of interest but possibly of lesser priority. At least ICC and V2X may require end-to-end (e2e) latency of less than 10 ms.

Support for ultra-reliable transmission (URC) may be desired. One design consideration for 5G networks may include transmission reliability that is better than what is possible with legacy LTE systems. For example, a possible target may be close to 99.999% transmission success and service availability. Another consideration may be support for mobility for speed in the range of 0-500 km/h. At least ICC and V2X may require a packet loss ratio of less than 10.sup.-6.

Support for MTC operation (including narrowband operation) may be desired. The NR air interface should efficiently support narrowband operation (e.g., using less than 200 KHz), extended battery life (e.g., up to 15 years of autonomy), and minimal communication overhead for small and infrequent data transmissions (e.g., low data rate in the range of 1-100 kbps with an access latency of seconds to hours).

Orthogonal Frequency Division Multiplexing (OFDM) may be used as the basic signal format for data transmissions in both LTE and in IEEE 802.11. OFDM essentially divides the spectrum into multiple parallel orthogonal subbands. Each subcarrier may be shaped using a rectangular window in the time domain, which may lead to sinc-shaped subcarriers in the frequency domain. OFDMA may thus require exact frequency synchronization and tight management of uplink timing alignment within the duration of the cyclic prefix to maintain orthogonality between signals and to minimize intercarrier interference. Such tight synchronization may not be well-suited in a system where a WTRU is connected to multiple access points simultaneously. Additional power reduction may also be applied to uplink transmissions to be compliant with spectral emission requirements to adjacent bands, in particular, in the presence of aggregation of fragmented spectrum for the WTRU's transmissions.

Some of the shortcomings of cyclic prefix based OFDM (CP-OFDM) may be addressed by more stringent RF requirements for implementations, especially when operating using large amount of contiguous spectrum not requiring aggregation. A CP-OFDM transmission scheme may also lead to a downlink physical layer for 5G similar to that of a legacy system (e.g., mainly including modifications to pilot signal density and location). Therefore, a flexible 5G (5gFLEX) design may be desired to consider other waveform candidates. It should be noted that CP-OFDM may remain a possible candidate for 5G systems for, at least, the downlink transmission scheme.

The 5gFLEX radio access design may be characterized herein by a high degree of spectrum flexibility. According to embodiments described herein, a high degree of spectrum flexibility may enable deployment in different frequency bands with different characteristics, including different duplex arrangements, and/or different variable sizes of the available spectrum, including contiguous and non-contiguous spectrum allocations in the same or different bands. It may also support variable timing aspects, including support for multiple TTI lengths and support for asynchronous transmissions.

The 5gFLEX radio access design may support both time division duplexing (TDD) and frequency division duplexing (FDD) schemes. For FDD operation, a supplemental downlink operation may be supported using spectrum aggregation. The FDD operation may support both full-duplex FDD and half-duplex FDD operation. For TDD operation, the DL/UL allocation may be dynamic (i.e., it may not be based on a fixed DL/UL frame configuration); rather, the length of a DL or a UL transmission interval may be set per transmission opportunity.

Beamforming may be also desired to compensate for increased pathloss at higher frequencies (e.g. >6 GHz). A large number of antenna elements may be used to achieve higher beamforming gain. Analog and/or hybrid beamforming may be used to reduce implementation cost (e.g., reduce the number of RF chains). Typically analog/hybrid beams may be multiplexed in time. Beamforming may be desired for sync, Physical Broadcast Channel (PBCH), and/or control channels to provide cell wide coverage. It should be noted that the term "beam sweep" may refer to transmission/reception of beamformed channels multiplexed in time, frequency, and/or space.

A Beam Reference Signal (BRS) may refer to any reference signal, preamble, or system signature that may be received and/or transmitted by the WTRU for one or more of the purposes described herein. Different BRSs may be defined for beam management in the DL and the UL. For example, downlink beam management may use a Channel State Information-Reference Signal (CSI-RS), a Demodulation Reference Signal (DMRS), a synchronization signal, or the like, and the uplink beam management may use a Sounding Reference Signal (SRS), DMRS, Random Access Channel (RACH) signal, or the like.

The term Discontinuous Reception (DRX) may refer to any form of power saving applied by a WTRU, which may be characterized by reduced reception and/or transmission activity. The term DRX may be equally applicable to any WTRU state (e.g., connected, inactive, idle state, etc.).

Connected mode DRX may specify a minimum Physical Downlink Control Channel (PDCCH) decoding requirement while a WTRU is configured with connected mode DRX. Connected mode DRX may define the active time for decoding of downlink control information (DCI) with Semi-Persistent Scheduling (SPS-) Cell RNTI (C-RNTI), Transmit Power Control-Physical Uplink Control Channel-RNTI (TPC-PUCCH-RNTI), Transmit Power Control-Physical Uplink Shared Channel-RNTI (TPC-PUSCH-RNTI), an enhanced interference mitigation and traffic adaptation (eIMTA)-RNTI, and Sidelink (SL)-RNTI. It may be based on fixed periodic "on-durations" which may occur once per DRX cycle.

The active time may include a time while an onDurationTimer corresponding to an on-duration is running, a drx-InactivityTimer is running, a drx-RetransmissionTimer is running, and/or a mac-ContentionResolutionTimer is running. The active time may include a time while a scheduling request is pending, a time an uplink grant for a pending HARQ retransmission can occur and there is data in the corresponding HARQ buffer, or when a PDCCH indicating a new transmission addressed to the C-RNTI of the WTRU has not been received after successful reception of a Random-Access Response for the preamble not selected by the WTRU, or any combination thereof.

A DRX operation may be controlled by one or more of the following timers or parameters. An onDurationTimer may indicate a number of consecutive PDCCH-subframes at the beginning of a DRX Cycle. A drx-InactivityTimer may indicate a number of consecutive PDCCH-subframes after a subframe in which a PDCCH indicates an initial UL, DL, or SL user data transmission for a MAC entity. A longDRX-Cycle may indicate a number of subframes in the long DRX cycle as configured by upper layers. A shortDRX-Cycle may indicate a number of subframes in a short DRX cycle as configured by upper layers. A drxShortCycleTimer may indicate a number of consecutive subframes the MAC entity follows the Short DRX cycle. As long as the drxShortCycleTimer is running, the WTRU will follow the short DRX cycle (i.e., the WTRU will perform operations defined for short DRX cycle). For example, while in a short DRX cycle, the WTRU may be configured to monitor PDCCH whenever the following is satisfied: (subframe number) modulo (short DRX cycle)=(drxstartoffset) modulo (short DRX cycle). The effect of this formula is that WTRU wakes up every short DRX cycle. To avoid all the WTRUs waking up in the same subframe, an additional offset is specified.

Figure 2:
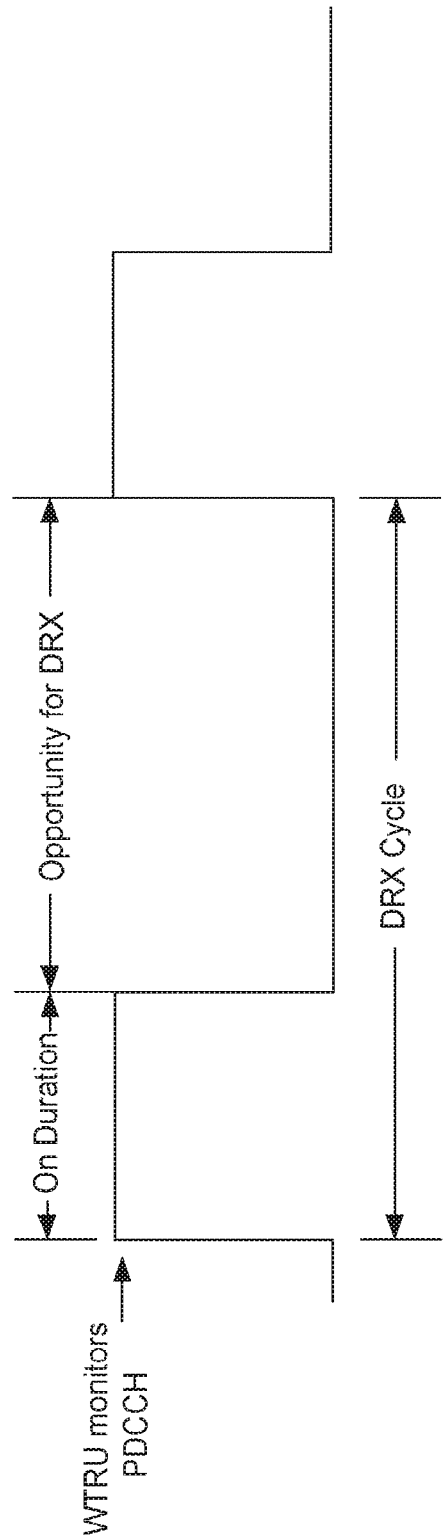
FIG. 2 is a diagram illustrating a method of Physical Downlink Control Channel (PDCCH) monitoring in a wireless transmit/receive unit (WTRU) in connected mode discontinuous reception (DRX)

Referring to FIG. 2, FIG. 2 shows a diagram illustrating PDCCH monitoring implemented by a WTRU in connected mode DRX according to one or more embodiments. According to FIG. 2, the WTRU is configured to monitor the PDCCH during an on duration of the DRX cycle, and may skip PDCCH monitoring during the remaining part of DRX cycle. Thus, the WTRU may be configured to operate according to a duty cycle with respect to monitoring the PDCCH.

Idle mode DRX may allow a WTRU in idle mode to monitor the PDCCH discontinuously for paging information (e.g., paging RNTI (P-RNTI)). One or more types of paging opportunities may be defined. In a first type, WTRU specific paging opportunities may be defined by the MME in NAS signaling. In a second type, cell-specific paging opportunities may be defined by a base station in system information block 2 (S1B2). A WTRU may be paged using the P-RNTI while in idle mode DRX for DL data arrival. This may be done to signal a change in system information in the cell, and for Earthquake and Tsunami Warning System (ETWS) notifications.

FIG. 3 is a table that defines various DRX parameters, the signal used to transmit the DRX parameter to the WTRU, and the configuring network node that is responsible for establishing the corresponding DRX parameter to be configured at a WTRU. For example, a WTRU specific DRX cycle $T_{WTRU}$ may be configured by the MME and transmitted to the WTRU by NAS signaling; a cell specific DRX cycle $T_C$ may be configured by the base station and transmitted to the WTRU by a broadcast signal (e.g., in system information transmitted on a Broadcast Channel (BCCH)); and a number of paging occasions per DRX cycle (nB) across all users in the cell may be configured by the base station and transmitted to the WTRU by a broadcast signal (e.g., in system information transmitted on the BCCH).

FIG. 4 is a table illustrating the derivation of a paging frame and a paging occasion based on a WTRU_ID. In particular, FIG. 4 describes various DRX parameters used by a WTRU to determine a paging frame and paging occasion. The paging frame is calculated based on WTRU identity (e.g. International Mobile Subscriber Identity (IMSI)), paging cycle of the WTRU, and number of paging frames within WTRU's paging cycle. The paging occasion is calculated based on subframe pattern, WTRU identity, number of paging subframes and number of paging frames within WTRU's paging cycle.

While utilizing beam management, the WTRU and the network (e.g., the base station) may communicate via a best beam pair in order to increase link robustness and/or achieve high throughput. While utilizing power saving techniques, such as DRX, power savings may be achieved during low data activity at the WTRU. Under certain conditions, beam management and power savings may be in conflict with each other. Thus, procedures for joint beam management and power savings are proposed such that the two may be optimized under various conditions (e.g., network capabilities, WTRU capabilities, and communication environments, such as channel quality, available bandwidth, single beam transmission, multi-beam transmission, etc.) and use cases, and may further be adapted on a dynamic basis as conditions and use cases change.

It should be noted that embodiments using beams and beamforming described herein are not intended to limit the applicability of the one or more methods to a non-beamformed scenario. The term beam management procedure (BMP) may refer to any link and/or beam management procedure. While in each beam management state, a WTRU may operate according to a different beam management procedure, including one or more beam management procedures.

Similarly, power savings may refer to any power saving algorithm or technique. Thus, embodiments that employ power savings procedures and/or DRX described herein are not intended to limit the applicability of the one or more methods to a specific state, and may be applicable to any WTRU state (e.g., idle, connected, inactive, or the like). Furthermore, power saving states may simply be referred to as power states, and vice versa, and some power states may not necessarily save power. For example, there may be at least one power state that expends the maximum power allotted by the WTRU, while other power states do not expend the maximum power allotted by the WTRU. The terms DRX and power savings procedure may be used interchangeably and may refer to any power savings procedure. Legacy LTE DRX may be used for example purposes without restricting the applicability of the methods disclosed herein to other procedures.

Embodiments described herein may enable coupling between one or more power savings procedures with one or more BMPs. The one or more power savings procedures may be applicable to control channel monitoring and reception (including legacy LTE DRX or similar), adaptation of applicable radio resources, and/or to other battery savings features.

A WTRU's connectivity to the network (e.g., a base station, a network node, another WTRU, or some other TRP) may be characterized by the relationship between WTRU beams and beams associated with one or more TRPs. For example, the relationship may be determined based on one or more measurements. The WTRU may have different beam relationships with different TRPs. In some embodiments, the WTRU may have multiple beam relationships even with a single TRP. Beam relationships between the WTRU and the network may be a function of different aspects. The relationships may be a function of a transmit direction, and there may be different relationships for an UL and a DL. The relationships may be a function of time and they may change due to changes in the environment/blockage. The relationships may be a function of channel type and different relationships may exist based on different channels associated with a specific beam class. In addition, the relationships may be a function of one or more of WTRU location, WTRU orientation, and WTRU power saving state. It will be appreciated that the relationships may depend or be a function of any combination of the above-identified, but is not limited thereto, and may depend on any condition that may have an effect on a beam pair.

In one or more embodiments, the WTRU may be responsible for creating and maintaining a mapping between the WTRU receive (Rx) beams and network transmit (Tx) beams. The WTRU may be configured with a mechanism to identify the DL Tx beam with implicit or explicit signaling. The WTRU may be responsible for maintaining the status of various WTRU Tx beams in terms of quality and/or desirability with reference to one or more network Rx beams. For example, the WTRU may determine or infer the relationship between the WTRU beam and the network beam based on a preexisting relationship between another WTRU beam and the network beam.

Figure 5:
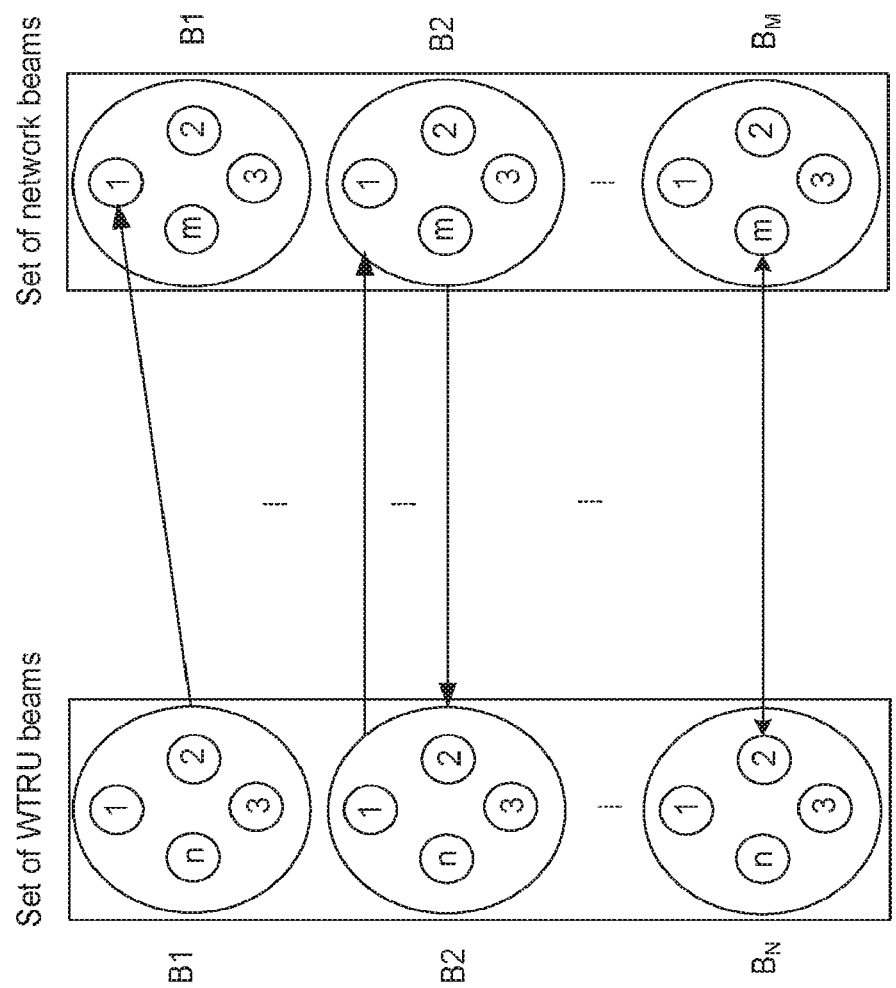
FIG. 5 is a diagram illustrating an example beam relationship between a WTU and a network according to one or more embodiments.

Referring now to FIG. 5, FIG. 5 shows a diagram illustrating an example of possible beam relationships between a WTRU and a network. The WTRU and/or the network may support hierarchical beams (e.g., wide beams and narrow beams). For example, the WTRU's support of hierarchical beams may be illustrated in FIG. 5 by the large (wide) beams (B1, B2, ..., $B_N$), which are wider than the small (narrow) beams (n, 1, 2, 3), which may be formed using any beamforming technique. A narrow beam has a narrow beamwidth (e.g., a narrow beam radiation pattern) that resides in a beamwidth of wide beam B1 of the network. In addition, a narrow beam may be transmitted at higher frequencies (e.g. >6 GHz) and may have a specific transmission and/or reception direction, and/or shape.

Similarly, the network's support of hierarchical beams may be illustrated in FIG. 5 by the large (wide) beams (B1, B2, ..., $B_M$), which are wider than the small (narrow)

beams (m, 1, 2, 3). The set of network beams may correspond to a single TRP or more than one TRP.

According to FIG. 5, in the first set of beams, wide beam B1 of the WTRU, having a wide beamwidth, is paired with narrow beam 1 of the network for an uplink transmission. For example, there may be some instances where paring a wide beam to a narrow beam may be beneficial (e.g., when a gNB wants to reduce interference or improve multiplexing efficiency). In the second set of beams, wide beam B2 of the WTRU is paired with wide beam B2 of the network for both downlink and uplink transmissions. In the third set of beams, narrow beam 2 of the WTRU is paired with narrow beam m of the network for both downlink and uplink transmissions, as indicated by the bidirectional arrow.

Thus, the WTRU and the network (NW) may be each configured with one or more sets of beams. The wide beams B1, B2, etc., may be used to transmit and/or receive control information via a control channel. In some instances, the wide beams B1, B2, etc., may be used to transmit and/or receive control information via a control channel and transmit and/or receive data via a data channel. Furthermore, in one or more embodiments, one or more narrow beams 1, 2, 3 and n at the WTRU and 1, 2, 3 and m at the network may be used to transmit and/or receive data via a data channel. It is also possible for narrow beams to transmit and/or receive control signaling via a control channel. Beam pairs may be formed between a WTRU Rx beam and a NW Tx beam on the downlink, and may be formed between a WTRU Tx beam and a NW Rx beam on the uplink. The downlink beam pair and the uplink beam pair may be formed by the same Tx and Rx beams of the respective WTRU and network, or may be formed by different Tx and/or Rx beams. Also, n may be less than m, since a WTRU typically has less narrow beams available than the network as the network may communicate with many more devices.

The WTRU and/or the network may support non-hierarchical beams where either wide beams or narrow beams are employed. One or more beams may partially overlap with each other. The WTRU and/or the network may perform transmission and/or reception on one or more beams at a given time. This may be based on the beamforming capability (e.g., analog, digital, or hybrid beamforming) of the device. The embodiments described herein may be also applicable for WTRUs with just one beam or no beamforming capability.

The WTRU may perform BMPs to establish, maintain, and/or remove a beam relationship with the network. Beam management procedures may be triggered either by the WTRU or by the network.

A BMP may be characterized by one or more of the following BMP parameters. One BMP parameter may be the number of beams involved in the BMP (e.g., all beams, a subset of beams, or one beam).

Another BMP parameter may be beam transmission/reception direction (e.g., separate beam management procedures may be defined for UL beams and for DL beams).

Another BMP parameter may be channels associated with the beam (e.g., separate beam management procedures may be implemented for a control channel operation and a data channel operation).

Another BMP parameter may be beam correspondence (e.g., separate procedures may be implemented for RX beam and TX beam management).

Another BMP parameter may be a MAC instance associated with the beam (e.g., separate procedures may be implemented for a beam associated with a serving MAC instance and a beam associated with a non-serving MAC instance).

Another BMP parameter may be one or more properties of the beam (e.g., separate beam management may be implemented for wide beams and for narrow beams). In some examples, the nature of the beam (i.e. wide beam or narrow beam) may be transparent to WTRU. The WTRU may be configured to perform beam management procedures associated with a specific type of reference signal or pre-configured subset of reference signals so that differential treatment of wide or narrow beams may be achieved. In other words, different beam management procedures may be defined for different type and/or subset of reference signals.

Another BMP parameter may be operating frequency (e.g., separate beam management may be implemented for intra-frequency beams and for inter-frequency beams).

Another BMP parameter may be feedback (e.g., one BMP may use explicit feedback such as closed loop and another BMP may not use feedback such as in the case of an open loop).

Another BMP parameter may be the nature of the reference signal (RS) associated with the BMP (e.g., a periodic RS or an on-demand RS associated with periodic beam management or aperiodic/on-demand beam management procedure).

Another BMP parameter may be the periodicity of reference signal transmission. In some embodiments, the WTRU may be configured with specific time and/or frequency and/or reference signal sequence resources to perform such transmission.

Another BMP parameter may be number of UL TX beams used for such reference signal transmission.

Another BMP parameter may number of beams on which the WTRU may be configured to monitor control channel.

Another BMP parameter may be number of DL beams to be measured.

Another BMP parameter may be number of beams reported in a beam feedback.

Another BMP parameter may be the DL reference signal resources used for measurement (e.g. periodic, semi-static or aperiodic resource).

Another BMP parameter may be types of beams to report, wherein the types of beams may be characterized by types of reference signals associated with such beams. For example, a first type of beam may be associated with synchronization reference signal and second type of beams may be associated with CSI-RS reference signal.

Another BMP parameter may be periodicity and/or resources used for beam feedback reporting.

The WTRU may instantiate one or more beam management procedures at a given time. If two or more BMPs are active at a given time, they may be referred to as parallel BMP instances. Each invocation of a beam management procedure may be referred as a BMP instance. As a result, the WTRU may have zero, one, or more than one BMP instance active at a given time. Additionally, two parallel BMP instances may differ by at least one beam management procedure parameter described above. The WTRU may create, update, and/or delete one or more beam relationships based on an outcome of a BMP instance.

A WTRU may be configured with a plurality of beam management (BM) states. Each BM state may be characterized by one or more of beam management procedures and one or more configuration aspects associated with such beam management procedures. In one example, different BM states may be associated with different beam management procedures. In another example, different BM states may be associated with a same beam management procedure but a different parameter configuration for the beam management procedure. Thus, different BM states configured at the WTRU may include any combination of beam management procedures, where each beam management procedure is different with same or different parameter configurations, and/or two or more beam management procedures may be the same with different parameter configurations.

The WTRU may transition from one BM state to another BM state depending on one or more factors (e.g., trigger conditions) described herein. For example, the WTRU may be in one of a plurality of BM states characterized by the status of the beam relationship with the network and/or the status of one or more active BMP instances at the WTRU. One or more BM states may be defined as follows.

One BM state may be a null BM state. A WTRU in this state may not have any beam relationship established with the network. Zero or more BMP instances may be active in the null BM state. If one or more BMP instances are active, at least one of those BMP instances may search for DL beams carrying a synchronization signal or a beam reference signal.

Another BM state may be an initial BM state. A WTRU may enter this state upon establishing relationship between at least one of its RX beams and one or more network TX beams carrying sync signals, PBCH, and/or system information. One or more BMP instances may be active in the an initial BM state. The WTRU may be configured with a BMP instance to establish a relationship for DL control beams. Additionally or alternatively, the WTRU may be configured with a BMP instance to establish a relationship for UL control beams.

In addition to the initial BM state, the WTRU may be configured with a first BM state (i.e., BM state A). Here, the WTRU may have a beam relationship established with the network for DL control transmissions and/or DL data transmissions. The WTRU may be configured with a BMP instance associated with a serving DL control beam. The serving DL control beam may be defined as a beam monitored by the WTRU for receiving downlink control messages such as grant messages (e.g., allocation grants) and/or feedback messages (e.g., HARQ feedback). The WTRU may be configured with a BMP instance for DL beams associated with serving MAC-instances (e.g., the WTRU may track/measure other candidate/backup beams for faster beam switching in case of a failure of a current beam pair).

In addition to the first BM state, the WTRU may be configured with a second BM state (i.e., BM state B). Here, the WTRU may have a beam relationship established with the network for UL control and/or data transmissions. The WTRU may be configured with a BMP instance associated with a serving UL control beam. The serving UL control beam may be defined as the beam used by the WTRU for transmitting UL control signals such as feedback and/or UL reference signals such as SRS, DMRS, BRS, RACH/SR, etc.

In addition to the second BM state, the WTRU may be configured with a third BM state (i.e., BM state C). Here, the WTRU may have a beam relationship established with the network for high throughput narrow beam DL data transmissions. The WTRU may be configured with a BMP instance associated with serving DL data beam. The serving DL data beam may be defined as the beam associated with DL data transmissions for the WTRU. The WTRU may be configured with a same beam or a different beam for DL data and DL control. The WTRU may be configured with a BMP instance for DL beams associated with non-serving MAC-instances (e.g., the WTRU may track/measure other candidate/backup beams for faster beam switching in case of a failure of a current beam pair).

In addition to the third BM state, the WTRU may be configured with a fourth BM state (i.e., BM state D). Here, the WTRU may have a beam relationship established with the network for high throughput narrow beam UL data transmissions. The WTRU may be configured with a BMP instance associated with serving UL data beam. The serving UL data beam may be defined as the beam used by the WTRU for transmitting the UL data channel and/or reference signals such as SRS, DMRS, BRS, etc.

In addition to the fourth BM state, the WTRU may be configured with a fifth BM state (i.e., BM state E). Here, the WTRU may be configured with a BMP instance for DL beams associated with non-serving MAC-instances operating on a different frequency. The WTRU may track/measure inter-frequency candidate/backup beams for faster beam switching in case of failure of a current beam pair.

For the purposes of describing the BM state transitions, there may some form of ordering between the BM states. The ordering may be based on specific transmission/reception overhead (including processing overhead) and energy consumption associated with the BM state. For example, the BM states may be arranged in an ascending order of overhead/energy consumption as follows: null<initial<first<second<third<fourth<fifth, where the null BM state has the least overhead and/or energy consumption. A reverse order of BM states may be defined if the criterion is link robustness (i.e., fifth<fourth<third<second<first<initial<null, where the fifth BM state is the least robust).

The WTRU may be configured with DRX to enable periods of low activity and/or power saving while ensuring that the WTRU is schedulable as per QoS boundaries/requirements. The WTRU may be configured with DRX such that different WTRUs are distributed in time as far as when DRX is enabled to avoid resource congestion.

The WTRU may be configured with information about the network's discontinuous transmission (DTX) periods (e.g., when transmission is disabled), so that the WTRU may enter DRX periods during the absence of network transmissions (i.e., when DTX is enabled). The information about the network DTX may be configured as silent durations when the WTRU may not expect any signals from the network (e.g., the base station).

The WTRU may be configured with a BMP to establish a beam relationship with the network so that it is possible to improve link robustness, achieve high throughput, and/or reduce interference to other WTRUs or cells. One outcome of the BMP procedure may be that different WTRUs may be distributed in the spatial domain, which may allow for increased spatial reuse and increased cell capacity. The WTRU may perform the BMP procedure to ensure sufficient connectivity for reliable control transmission and/or best connectivity for high throughput data transmission.

A joint DRX and beam management procedure may be utilized to achieve a tradeoff between interruption time, energy efficiency, and overhead. It may be desirable to perform just-in-time beamforming. In other words, it may be desirable to avoid late beamforming, which may lead to interruption, and early/unnecessary beamforming, which may lead to stale beams.

The WTRU may be configured to perform a joint DRX and beam management procedure such that overall power consumption may be minimized for a given link robustness with acceptable overhead and interruption times.

The interaction between DRX management and beam management may be a function of active services at the WTRU. For example, the WTRU may be configured with adapting DRX characteristics based on a current BM state, for example, when link robustness is prioritized over power savings, in the case to support critical services and/or low latency services, and/or in the case to support a medium/high transitional or rotational mobility state. Alternatively, the WTRU may be configured to adapt beam management characteristics based on a current DRX status, for example, when power savings is prioritized over link robustness or in the case of latency tolerant services, low throughput services, and/or low mobility state.

According to one or more embodiments, a set of power savings states (e.g., different levels of layer 1 (L1) and layer 2 (L2) processing and/or RF configuration) may be linked or mapped with beam management states (e.g., different levels of beam management), such that a transition between two states at the power savings procedure may induce similar transition at the beam management level, and vice-versa.

The interaction between power states (e.g., DRX states) and beam management states may reduce excessive signaling and may avoid the need for separate configuration and/or control for those aspects between the WTRU and the network.

Figure 6:
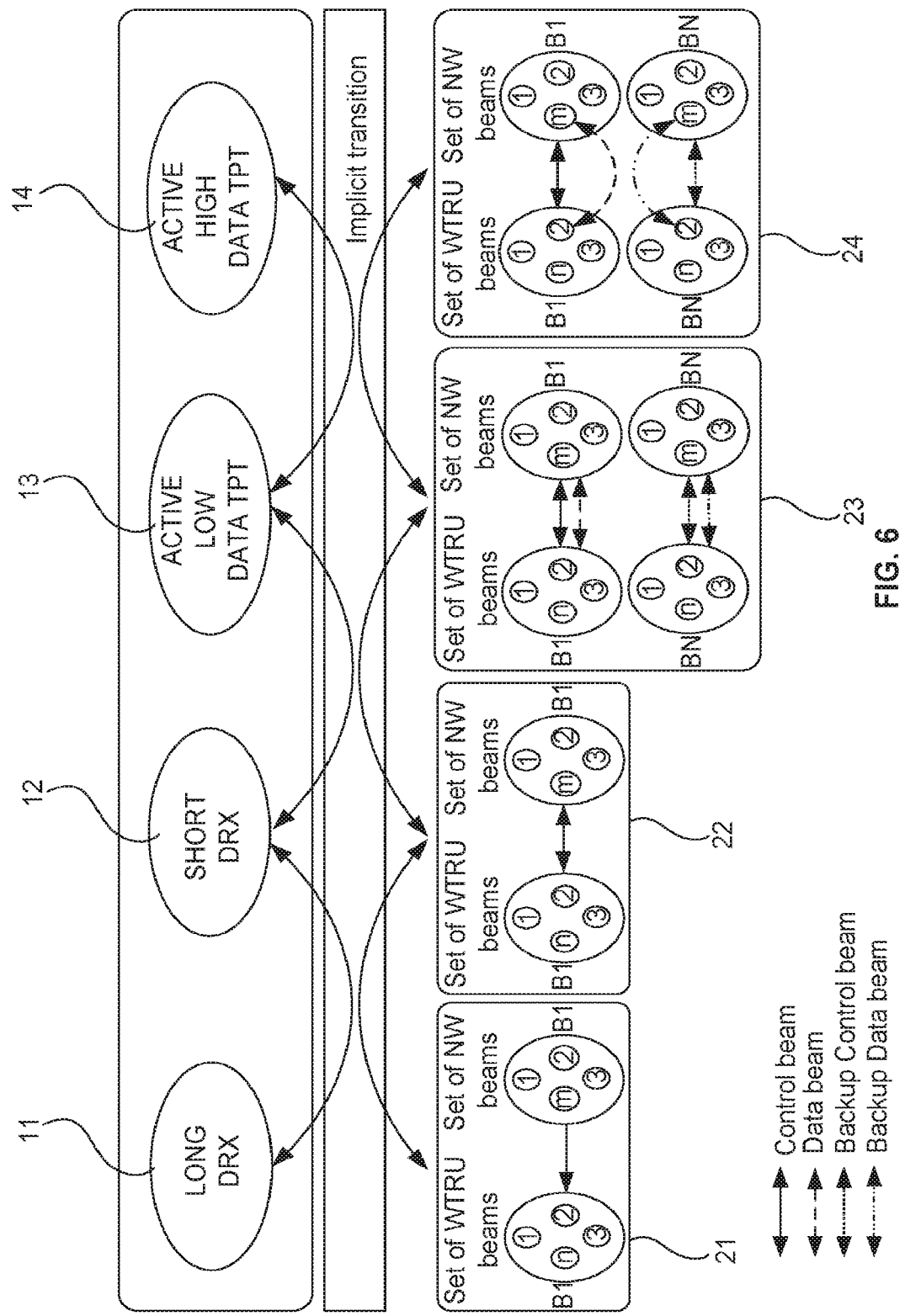
FIG. 6 is a diagram illustrating an example interaction between beam management states and power states according to one or more embodiments.

FIG. 6 is a diagram illustrating an example interaction between BM states and power states according to one or more embodiments. The power states include a long DRX state 11, a short DRX state 12, an active low data throughput time (TPT) state 13, and an active high data TPT state 14. While four specific power states are shown, these are merely examples and the embodiments provided herein are not limited thereto. Thus, there may be more or less than four power states, and different types of power states than the ones shown may be configured at the WTRU. For example, the power states may include WTRU states that utilize different levels of L1/L2 processing and/or different RF configurations.

In addition, the different BM states are examples of different beam relationships between a WTRU and a network. The BM states include a first BM state 21, a second BM state 22, a third BM state 23 and a fourth BM state 24. While four specific BM states are shown, these are merely examples and the embodiments provided herein are not limited thereto. Thus, there may be more or less than four BM states, and different types of BM states than the ones shown may be configured at the WTRU. For example, the BM states may include at least one of different level of beam measurement, reporting and/or UL beam reference signal transmission.

The WTRU and the network (NW) are each configured with one or more sets of beams. For example, as shown in FIG. 5, a WTRU may be configured with a wide beam B1 and one or more narrow beams 1, 2, 3, and n. The wide beam B1 may be used to transmit and/or receive control information via a control channel and/or transmit/receive initial data transmissions when narrow beam pair links are not yet established or not required to be established. The one or more narrow beams 1, 2, 3, and n may be used to transmit and/or receive data via a data channel.

Similarly, the network (e.g., a base station) may be configured with a wide beam B1 and one or more narrow beams 1, 2, 3, and m. The wide beam B1 may be used to transmit and/or receive control information, including configuration information, via a control channel and/or to transmit/receive initial data transmissions when narrow beam pair links are not yet established or not required to be established. The one or more narrow beams 1, 2, 3, and m may be used to transmit and/or receive data via a data channel, and in some instances may be used to transmit and/or receive control information via a control channel.

Thus, wide beam B1 of the WTRU may form a beam pair with wide beam B1 of the network. Similarly, narrow beams 1, 2, 3, and n of the WTRU may form one or more beam pairs with narrow beams 1, 2, 3, and m of the network. Typically, n<m, since a WTRU typically has less narrow beams available than the network as the network may communicate with many more devices.

A candidate beam is a backup beam that is maintained by the WTRU and the network. The candidate beam can be used if the serving beam fails abruptly. Thus, "candidate beam", "backup beam", and "secondary beam" may be used interchangeably herein. Similarly, "serving beam", "active beam", and "primary beam" may be used interchangeably herein.

Each BM state 21-24 is configured such that one or more beam pairs is established between the WTRU and the network such that the WTRU and the network can communicate via the best beam pair under the current environment and power saving conditions (e.g., to increase link robustness using a wide beam pair and/or achieve high throughput via a narrow beam pair).

The BM states 21-24 may differ in which types of beams (e.g., wide and/or narrow) are paired between the WTRU and the network, the number of beams paired, the characteristics of the beams themselves, and/or any other parameter associated with beam management procedure.

A downlink is formed by a beam pair including a Tx beam at the network and an Rx beam at the WTRU. An uplink is formed by a beam pair including an Rx beam at the network and a Tx beam at the WTRU. The downlink beam pair and the uplink beam pair may be formed by the same Tx and Rx beams of the respective WTRU and network, or may be formed by different Tx and/or Rx beams.

The BM states 21-24 may differ in whether a downlink control beam is paired, whether a downlink data beam is paired, whether an uplink control beam is paired, and whether an uplink data beam is paired. The direction of the directional arrows shown in BM states 21-24 indicate which type of beam is paired for each BM state 21-24.

For example, in BM state 21, only a downlink control beam pair which includes a pairing between the wide beam B1 (i.e., Rx beam) of the WTRU with the wide beam B1 (i.e., Tx beam) of the network. As an option, minimal WTRU feedback may be permitted in this BM state.

BM state 21 represents the lowest beam pairing state and uses the least amount of power. This is the lowest BM state for a WTRU camped on a cell. Since BM state 21 uses the least amount of power of the four BM states, it is linked to the first power state, the long DRX state 11, which uses the least amount of power among the power states.

In BM state 22, both a downlink control beam pair and an uplink control beam pair are used. Here, the network may know the WTRU's Tx (uplink) beam so that it can tune its Rx beam to receive the WTRU's Tx beam. Both downlink control beam pair and an uplink control beam pair may be formed using wide beams.

BM state 22 represents an intermediate beam pairing state and uses an intermediate amount of power. Since BM state 22 uses the next highest amount of power of the four BM states, it is linked to the second power state, the short DRX state 12, which uses the second least amount of power among the power states.

When the WTRU enters either BM state 21 or 22, the WTRU may stop transmitting reference signals and measurement feedback that are used for narrow beam pair establishment and/or maintenance. In some embodiments, the characteristics of beam management procedures, i.e., the periodicity of reference signal transmission and/or measurement, the number of beams to monitor control channel, the number of backup beams to track, the number of beams to report, the types of beams to report, and/or the periodicity of beam feedback reporting may be adapted based on the power state. For example, in BM state 21 or 22, the WTRU may be configured to perform lower rate of reference signal transmission, longer measurement intervals, slower/less detailed feedback, and/or perform a beam management procedure with a configuration based on BM state.

In BM state 23, both a downlink control beam pair and an uplink control beam pair are used. These uplink and downlink control beam pairs are formed using the wide beams. In addition, a downlink data beam pair and an uplink data beam pair are used, which are also formed by the wide beam pair.

In addition, backup control beams may be used in the uplink and/or downlink in case one of the serving/active control beams fail. These backup uplink and downlink control beam pairs are formed using another set of wide beams, which are also used for a backup uplink and downlink data beams.

Thus, primary beam pairs may be used as serving/active control beam pairs and serving/active data beam pairs, and secondary beam pairs may be used as candidate/backup beam pairs in both uplink and downlink directions. To maintain a backup beam pair while using an active beam pair, the WTRU may measure the reference signals on the downlink and may transmit reference signals on the uplink.

BM state 23 represents another intermediate beam pairing state and uses an intermediate amount of power, but more power than BM state 22. Since BM state 23 uses the next highest amount of power of the four BM states, it is linked to the third power state, the active low TPT state 13, which uses the second most amount of power among the power states.

In BM state 24, both a downlink control beam pair and an uplink control beam pair are used. Both downlink control beam pair and an uplink control beam pair may be formed using wide beams.

In addition, a downlink data beam pair and an uplink data beam pair are used. Both downlink data beam pair and an uplink data beam pair may be formed using narrow beams.

Also, candidate/backup control beams and candidate/backup data beams may be used in either direction. Thus, backup control beams may be used in the uplink and/or downlink in case one of the active control beams fail. Similarly, backup data beams may be used in the uplink and/or downlink in case one of the active data beams fail. Here, the backup control beams may be formed using wide beams, and the backup data beams may be formed using narrow beams. To maintain a backup beam pair while using an active beam pair, the WTRU may measure the reference signals on the downlink and may transmit reference signals on the uplink.

Thus, primary beam pairs may be used for both active control beam pairs and active data beam pairs, and secondary beam pairs may be used as backup beam pairs in both uplink and downlink directions for both control information and data. The control beams may be formed using wide beams, and the data beams may be formed using narrow beams.

BM state 24 represents the highest beam pairing state and uses the most amount of power. Since BM state 24 uses the highest amount of power of the four BM states, it is linked to the fourth power state, the active high TPT state 14, which uses the most amount of power among the power states.

When the WTRU enters either BM state 23 or 24, the WTRU may start transmitting reference signals and measurement feedback that are used for narrow beam pair establishment and/or maintenance. In some embodiments, the characteristics of beam management procedures, i.e., the periodicity of reference signal transmission and/or measurement, the number of beams to monitor control channel, the number of backup beams to track, the number of beams to report, the types of beams to report, and/or the periodicity of beam feedback reporting may be adapted based on the power state. For example, in BM state 22 or 23, the WTRU may be configured to perform higher rate of reference signal transmission, shorter measurement intervals, faster/more detailed feedback, and/or perform a beam management procedure with a configuration based on BM state.

As noted above, each of the power states 11-14 is linked to or associated with a different one of the BM states 21-24, for example, via an implicit relationship. This linking information may be provided in configuration information or control information provided by the network. Alternatively, the WTRU may be preconfigured with the linked information that maps the power states and BM states to each other. Thus, a WTRU may be configured with a set of power states 11-14 having different levels of L1/L2 processing and/or RF configurations coupled with a set of beam management states 21-24 having different levels of beam measurement, feedback reporting and/or UL beam reference signal transmissions.

The WTRU may be configured to initiate a transition from one of the power states 11-14 to another one of the power states 11-14, according to a power savings algorithm that is based on any of the triggers (i.e., trigger conditions) described herein, and may induce a preconfigured transition between BM states 21-24, and vice-versa, by referring to the linked relationship between power states and BM states. Thus, the WTRU may be configured to initiate a transition from one of the BM states 21-24 to another one of the BM states 21-24, according to a beam management algorithm that is based on any of the triggers described herein, and may induce a preconfigured transition between power states by referring to the linked relationship between power states and BM states.

In one example, a WTRU may enter a beam management state (e.g., BM state 21) associated with wide/control channel beam reception at the start of an on-duration. A WTRU may exit a beam management state (e.g., BM state 24) associated with candidate beams and/or high gain narrow beams upon entering a long DRX cycle. Similar rules may be used for network triggered DRX commands, and other triggers described herein.

Based on the above configuration, the WTRU is configured to transition between BM states of the set of BM states based on the current power state to which a current BM state is linked, and/or vice versa, such that power efficient beam management may be realized.

Figure 7:
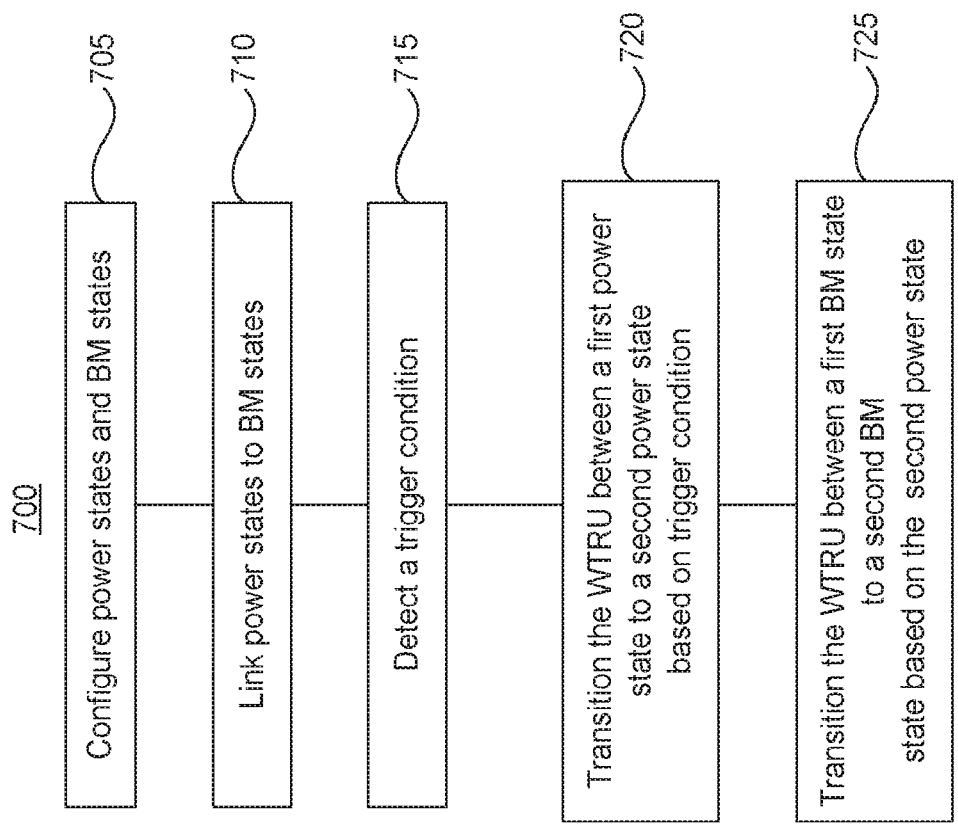
FIG. 7 is a flow diagram illustrating a beam management procedure according to one or more embodiments.

FIG. 7 is a flow diagram illustrating a beam management procedure 700 according to one or more embodiments. The beam management procedure 700 according includes: configuring a WTRU to operate according to a plurality of power states and a plurality of BM states (operation 705); linking the plurality of power states to the plurality of BM states such that each power state corresponds to a different BM state (operation 710); detect a trigger condition that causes or initiates a transition between power states (operation 715); transitioning the WTRU between power states of the plurality of power states to a current power state (operation 720); and transitioning the WTRU between BM states of the plurality of BM states to a current BM state based on the current power state to which the current BM state is linked (operation 725).

Figure 8:
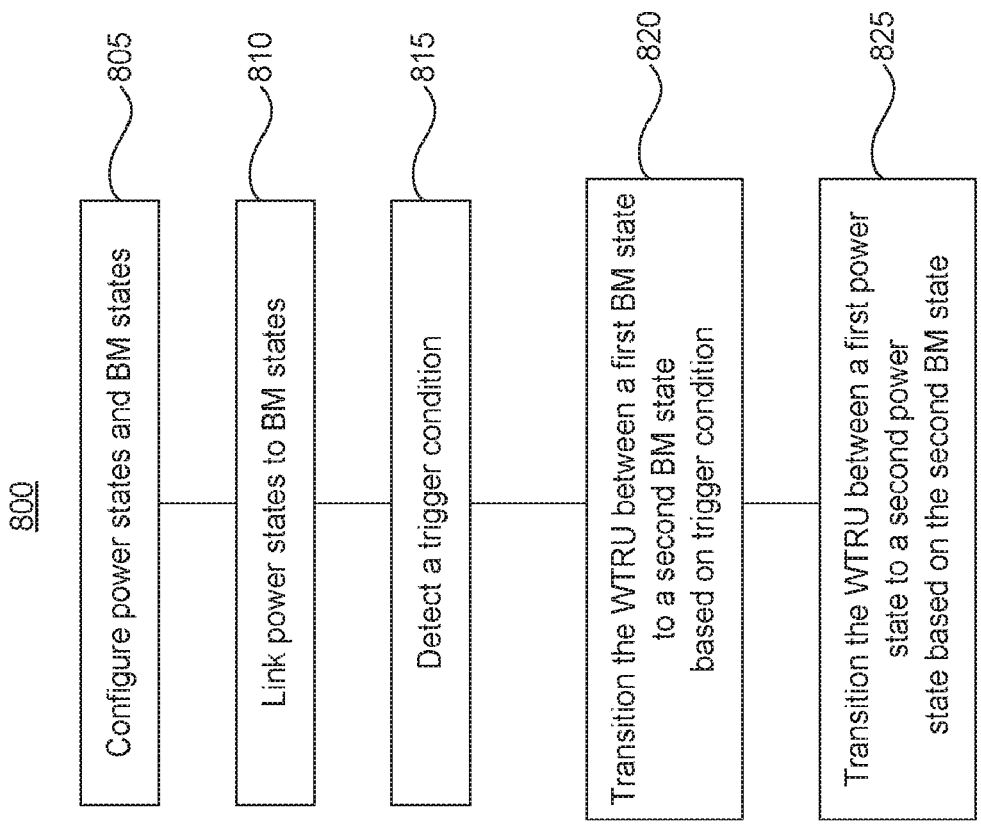
FIG. 8 is a flow diagram illustrating a beam management procedure according to one or more embodiments.

FIG. 8 is a flow diagram illustrating a beam management procedure 800 according to one or more embodiments. The beam management procedure 800 according includes: configuring a WTRU to operate according to a plurality of power states and a plurality of BM states (operation 805); linking the plurality of power states to the plurality of BM states such that each power state corresponds to a different BM state (operation 810); detecting a trigger condition that causes or initiates a transition between BM states (operation 815); transitioning the WTRU between BM states of the plurality of BM states to a current BM state (operation 820); and transitioning the WTRU between power states of the plurality of power states to a current power state based on the current BM state to which the current power state is linked (operation 825).

According to beam management procedures 700 and 800, a beam management state associated with wide/control channel beam reception may be entered at a start of an on-duration of a receiver of the WTRU. In addition, a beam management state associated with candidate beams and/or high gain narrow beams may be exited upon the WTRU entering a long DRX cycle or a short DRX cycle.

The WTRU may determine one or more aspects related to beam management behavior based on one or more aspects related to power saving behavior. The WTRU may determine the interaction either based on implicit rules or based on explicit configuration from the network. For example, the WTRU may determine one or more of the number and/or type of BMP instances, frequency/periodicity of BMPs, spatial extent of BMPs (e.g., tracking subset of beams), and reporting periodicity/size as a function of activity levels (e.g., L1/L2 activity) of the WTRU.

The WTRU may be configured with a predefined linkage between power saving states (e.g., DRX states) of the WTRU and the BM states of the WTRU. For example, the WTRU may trigger changes to BM state based on changes in a DRX state and/or other power states.

The WTRU may perform beam management procedures as a function of the activity level (e.g., level of L1/L2 activity) of the WTRU and/or as a function of the power state of the WTRU. For example, the WTRU may establish one or more BMP instances based on changes in activity level in the WTRU. Additionally or alternatively, the WTRU may terminate/stop one or more BMP instances based on changes in activity level of the WTRU. The WTRU may receive configuration information on the linkage between BM states and power states in a radio resource control (RRC) configuration message or the linkage may be preconfigured at the WTRU. The linkage between power states (e.g., DRX states) and BM states may be beneficial to reduce signaling overhead between the WTRU and the network. For example, the WTRU may receive control signaling that results in the changes to the DRX state, which implicitly may also determine the BM state of the WTRU. Thus, as the WTRU changes power states changes, it also changes BM states based on the linkage between the power saving states and the BM states. The opposite may also true. That is, a change in BM state at the WTRU may result in a change of the power saving state of the WTRU based on the configured linkage between BM states and power saving states.

The linkage between power states and BM states may also enable the setting of an operating point that allows for a tradeoff between energy efficiency and link efficiency/robustness. The WTRU may adapt one or more of the operations related to beam management, such as monitoring DL BRS, beam tracking, transmission of UL BRS, and transmission of beam related feedback as a function of WTRU activity and/or power saving state.

According to one or more embodiments, the WTRU may initiate a change in a BM state based on one or more triggers associated with a DRX state. One trigger may be initiated at the end of an active time of a DRX cycle, or at an offset time from the end of the active time. At the end of active time, the DL at the receiver (i.e., used for monitoring of PDCCH) may be disabled. Here, the WTRU may transition from a BM state to a second BM state (e.g., BM state B) at a time offset from the end of the active time. The WTRU may be preconfigured with a offset value that may be equal to zero or greater. The WTRU may determine the change of BM state based on whether the DRX cycle length is above or below a predefined threshold.

For example, in case of shorter DRX cycles (i.e., short DRX) where the DRX cycle length is less than the predefined threshold, the WTRU may avoid transitions to a different BM state and may stay in a current BM state. The WTRU may trigger different BM state transitions based on whether short DRX is configured at the WTRU or not. For example, if short DRX is configured, the WTRU may transition to the second BM state (e.g., BM state B) at the end of active time or at a set offset therefrom. If short DRX is not configured, the WTRU may transition to a first BM state (e.g., BM state A) at the end of active time or at a set offset therefrom.

Another trigger associated with a DRX state may be the start of on-duration of a DRX cycle (i.e., when DRX is disabled and monitoring is enabled). The WTRU may transition to the first BM state (e.g., BM state A) at the start of the on-duration if the WTRU was in the initial BM state prior to the on-duration. The WTRU may remain in the same BM state if the WTRU was in the second, third, fourth, or fifth BM states (e.g., BM states B, C, D or E) prior to the on-duration. The WTRU may trigger the BM state transition based on whether the WTRU received a valid grant during the on-duration of the DRX cycle. For example, a WTRU in the first BM state (e.g., BM state A) during the start of the on-duration may transition to the second BM state (e.g., BM state B) upon receiving a valid scheduling grant while monitoring the PDCCH.

Another trigger associated with a DRX state may be the transition from a short DRX cycle to a long DRX cycle. A cycle length threshold may be configured at the WTRU such that a cycle length below (or equal to) the cycle length threshold may be determined by the WTRU as a short DRX cycle, and cycle length greater than (or equal to) may be determined by the WTRU as a long DRX cycle. The WTRU may transition from a second BMP state (e.g., BM state B) to a first BMP state (e.g., BM state A) when transitioning from a short DRX cycle to a long DRX cycle, and vice versa.

Another trigger associated with a DRX state may be receipt of a DRX command from the network (e.g., a base station). The WTRU may implicitly transition to a predefined BM state based on reception of a DRX command from the network. For example, the WTRU may trigger a transition to the second BM state (e.g., BM state B) from another BM state if a DRX command is received and short cycle is configured. That is, the network may order a WTRU in a non-DRX state to enter DRX by transmitting an explicit DRX command. The WTRU moves to DRX, but which DRX cycle to use is based on prior configuration (e.g., the WTRU uses short DRX cycle if configured or else uses long DRX cycle). The WTRU may trigger a transition to the first BM state (e.g., BM state A) from another BM state if a DRX command is received and no short cycle is configured.

The WTRU may determine one or more aspects related to DRX behavior based on one or more aspects related to beam management behavior. The WTRU may determine such interaction either based on implicit rules or based on explicit configuration from the network (e.g., a base station).

As described above, the WTRU may be configured with a predefined linkage between BM states of the WTRU and the DRX states of the WTRU. For example, the WTRU may trigger changes to the DRX state based on changes in the BM state, or vice versa. The WTRU may perform power saving procedures as a function of beam relationship to the network in addition to the activity level of the WTRU.

The WTRU may also trigger changes to the DRX state based on the presence and/or absence of one or more signals associated with beam management. For example, the WTRU configuration aspect may indicate absence of signals associated with beam management and/or any signal associated with a specific beam (e.g., beam level DTX). Upon determining an absence of one or more DL signals relevant for beam management, the WTRU may trigger the DRX state to enter a low activity mode. In one example, the WTRU may receive a deactivation or deletion of one more beam management resources in the UL (e.g., UL BRS resource). The WTRU may transition to a low overhead BM state and trigger a transition to a low activity DRX state.

Such interaction between absence of one or more signals and a change in DRX state may allow for an efficient network DTX and energy savings. For example, the WTRU may not assume a periodic transmission of RS (e.g., BRS) from the network. Instead, the WTRU may adapt a DRX state with the additional knowledge of the network activity levels in space, such as the coarse level (e.g., cell/sector level or finer level in terms of beams) and time (e.g., coarse level in order of hundreds of milliseconds or a finer level in the order of a few slots due to time multiplexing of beams.

For example, the WTRU may be configured with information about the schedule of DL BRS signals and/or UL BRS resources associated with beam management. The configuration may indicate a periodic schedule of DL BRS signals and/or UL BRS resources. The WTRU may transition to a specific BM state to receive/transmit one or more of DL or UL BRS signals. The BM state transition may override any DRX state transitions. The interaction may be particularly beneficial as the network may not need to explicitly ensure that the WTRU DRX configuration is synchronized with the beam management configuration.

The WTRU may differentiate between an activity related to DL data transmission and an activity related to DL beamforming. The WTRU may be configured to monitor a control channel with a pre-defined radio network identifier (RNTI), or any other DL signal in a beam, for a schedule of on-demand DL BRS signals in other beams. The WTRU may be configured to monitor for the on-demand transmissions in predefined DL resources. Certain aspects of DRX behavior (e.g. DRX timers) may not be impacted by the on-demand signal receptions.

The WTRU may differentiate between an activity related to UL data transmission and an activity related to UL beamforming. The WTRU may be configured to transmit UL BRS signals for UL beam management. The WTRU may be pre-configured with UL resources for the UL BRS transmissions. The UL transmissions may be "one-shot" transmissions and may not be associated with feedback. Certain aspects of DRX behavior (e.g., DRX timers) may not be impacted by the one-shot transmissions.

For example, a BMP may bring the WTRU to a higher level of L1/L2 activity (e.g., DRX Active State or similar) when the WTRU determines that it determines that decoding of a control channel in support of further beam management-related procedures may be required. This may be performed in a case in which the beam monitoring and/or resource allocation for reference signals may be dynamically scheduled.

The WTRU may trigger changes in BM state based on the status of a beam relationship. The changes in BM state may further trigger changes to the DRX state in order to execute beam management procedures. A WTRU in the first BM state (e.g., BM state A) and a low activity DRX state, upon detecting a loss of a DL beam, may transition to a medium or high activity DRX state to detect, measure, and/or monitor a DL BRS associated with one or more DL beams. A WTRU in a second BM state (e.g., BM state B) and a low activity DRX state, upon detecting a loss of a DL beam, may transition to a medium or high activity DRX state to perform UL BRS transmissions to recover the UL link.

The WTRU may delay entering into a low activity state if the quality of the serving DL control beam is below a predefined threshold. The WTRU may enter the low activity state if the quality of the serving DL control beam becomes better than a predefined threshold. The WTRU may delay entering into low activity state until completion of an ongoing BMP procedure. The WTRU may start active time or enter a short DRX cycle if the BMP results in change in the DL and/or UL relationship.

The WTRU may be configured by the network to enter a BM state or to perform a beam management procedure. Such explicit configuration may override the triggers for DRX state transition.

The WTRU may be configured to perform beam management procedures on-demand based on certain local triggers. The beam management procedures may trigger changes to the DRX state of the WTRU, even though the local triggers may not affect the DRX state.

For example, the WTRU may be configured to detect some user activity (e.g., user picks up the phone, unlocks the phone, etc.) as a trigger to refresh the beam relationship with the network.

In addition or in the alternative, the WTRU may be configured to monitor and/or detect changes in orientation (e.g., based on gyroscope/accelerometer, etc.). Upon detecting an orientation change greater than predefined threshold, the WTRU may instantiate one or more BMP instances to refresh the beam relationship with the network (e.g., base station). The BM state changes may trigger the WTRU to move to a DRX state (e.g., linked to the BM state) that allows for reception/transmission of signals associated with beam management procedures.

The WTRU may be configured with a generic power saving/DRX framework that is applicable to different WTRU states (e.g., idle mode, connected mode, and/or inactive mode). The generic power saving/DRX framework may be made of one or more of the following phases.

One phase may be a sleep phase. The WTRU may perform no activity or little activity in this phase. The WTRU may turn off one or more functions associated with receiver and/or transmit operation.

In connected mode, the sleep phase may correspond to the "Opportunity of DRX" portion of a DRX cycle and/or periods other than the active time of the DRX cycle. One or more exceptions may apply (to be described later).

In idle/inactive mode, the sleep phase may correspond to part of the paging cycle where the WTRU is not actively monitoring the paging occasion. One or more exceptions may apply (to be described later).

Another phase may be a synchronization and measurement phase. During this phase, the WTRU may activate one or more BMP instances to perform beam level synchronization and measurements. The WTRU may be configured to determine the synchronization and measurement phase explicitly. This phase may be implemented to support lean design and efficient network DTX. The WTRU may not assume BRS signals are periodic and/or transmitted all the time for any or all beams associated with the transmission point. The WTRU may be configured with a receiver and a processor to determine the presence of BRS signals either semi-statically or dynamically. The WTRU may not assume that the network is always on or available. The WTRU may be configured with a DTX configuration of the network.

During this synchronization and measurement phase, the WTRU may be configured determine one or more synchronization and/or measurement opportunities before a network schedulability/reachability phase.

During the synchronization and measurement phase, the WTRU may perform one or more of time and/or frequency synchronization. The WTRU may make a determination of the validity of RX beam relationships. The WTRU may determine new RX beam relationships if applicable.

Another phase may be a WTRU assistance phase. The WTRU may be configured to provide some assistance to the network to reduce overhead associated with the network schedulability/reachability phase. In addition to reducing overhead, the WTRU assistance phase may allow the WTRU to establish the UL beam relationship with the network (e.g., the base station). The WTRU may be configured determine a timing for WTRU assistance opportunities before the network schedulability/reachability phase based on the commination environment.

Another phase may be a network schedulability/reachability phase. Here, the WTRU may be configured to monitor for possible notifications and/or scheduling from the network during this phase. In a connected mode, the network schedulability/reachability phase may correspond to an "on-duration" e.g., of a DRX cycle. In an idle/inactive mode, the network schedulability/reachability phase may correspond to paging occasion to receive core network (CN) paging. In an inactive mode, the network schedulability/reachability phase may correspond to paging occasion to receive RAN paging.

The WTRU may perform one or more aspects related to the beam management procedure in a time unit that is offset earlier than the network schedulability/reachability phase. The WTRU may perform one or more of time and/or frequency synchronization, determination of the validity of RX beam relationship, and determining new RX beam relationships.

The WTRU may determine the value of the time offset based on one or more of the following parameters. One parameter may be the number of DL TX beams in the cell. Another parameter may be the number of DL RX beams to be used for measurements by the WTRU. Another parameter may be the amount of time elapsed since the last active period.

Another parameter for determining the time offset may be the number of channel beams that were configured and/or measured by the WTRU at the end of the previous active period, or at the previous instance in which the WTRU was performing control channel monitoring. For control channel beams configured for reception of the control channel, or configured to be used as alternate beams, the WTRU may add an additional period to the total amount of time for which the WTRU wakes up prior to the scheduled active time.

Another parameter for determining the time offset may be the measured beam quality of one or more beams at the end of the last active period of the DRX cycle, or over the previous active period of the DRX cycle.

Another parameter determining the time offset may be the extent of WTRU orientation changes in the previous active period.

Another parameter determining the time offset may be the DTX state of the network (e.g., dormant, discoverable, high visibility, etc.). The presence/periodicity of one or more of sync, BRS signals from the network may be considered in determining the DTX state of the network. In addition, different DL TX beams may be in different states. Thus, the state of different DL TX beams (e.g., active or inactive) may be considered.

Another parameter determining the time offset may be the whether the WTRU is configured to provide UL assistance and/or the characteristics of the configured UL assistance.

The WTRU may detect and/or measure the BRS associated with the last used DL TX beam using the last used DL RX beam. If the DL RX beam is below a predefined threshold, the WTRU may measure the BRS associated with the last used DL TX beam using one or more different DL RX beams. If those are below a predefined threshold, the WTRU may measure BRS associated with multiple DL TX beams with one or more DL RX beams. A predefined threshold may be based on reference signal received power or signal to noise ratio (SINR) metric.

Similarly, the WTRU may detect and/or measure one or more BRS signals transmitted from the last DL TX beam using the last used DL RX beam. If the DL RX beam is below a predefined threshold, the WTRU may measure the BRS associated with the last used DL RX beam using different DL TX beams. If those are below a predefined threshold, the WTRU may measure BRS associated with multiple DL TX beam with one or more DL RX beams. A predefined threshold may be based on reference signal received power or signal to noise ratio (SINR) metric.

The term BRS may refer to a synchronization signal and/or any DL reference signal/signature associated with a beam. At the end of the synchronization and measurement phase, the WTRU may use one or more candidate beam pairs to monitor for a downlink notification or downlink schedule during this power saving cycle.

The WTRU may perform UL transmissions to implicitly or explicitly provide assistance to the network during a WTRU assistance phase. Such assistance information may be used by the network to limit the excessive beam sweeping overhead due to downlink notification transmission. WTRU assistance may be beneficial even when beamforming is not used, for example, to reduce the downlink notification/schedule transmission over a geographical area. The WTRU assistance phase may be applicable for beamformed and/or non-beamformed transmissions in UL and/or DL.

During the WTRU assistance phase, the WTRU may be configured to transmit UL assistance based on dynamic or semi-static signaling. The WTRU may implicitly determine to provide UL assistance based on predefined rules. The configuration aspects/rules may include one or more of the following: UL resource used for assistance information transmission; timing of UL assistance (e.g., network schedulability/reachability phase); periodicity of UL assistance (e.g., every DRX cycle or every n DRX cycle); and/or repetition of UL assistance (e.g., repetition in time and/or space with possible beam sweep).

The WTRU may determine to provide UL assistance based on one or more of the following aspects. One aspect used by the WTRU to determine whether to provide UL assistance may be based on broadcast signaling. A broadcast message (e.g., system information block (SIB)) may configure the WTRU to provide UL assistance. A WTRU in idle state may perform UL assistance based on configuration information received in the broadcast message.

One aspect used by the WTRU to determine whether to provide UL assistance may be based on the characteristics of DL signals. The WTRU may determine whether to provide UL assistance based on reception of one or more downlink signals with a predefined characteristic (e.g., the type of signal, resource element (RE) mapping, or a timing relation). With respect to an RE mapping, the WTRU may determine if WRTU assistance is required based on to which Resource Elements a DL signal is mapped.

One aspect used by the WTRU to determine whether to provide UL assistance may be based on the WTRU state (e.g., connected, inactive, idle state, etc.). A WTRU in a specific state (e.g., inactive state) may be configured to transmit UL assistance. The WTRU may determine the UL resources for assistance information transmission using one or more aspects of WTRU context stored during an inactive state.

One aspect used by the WTRU to determine whether to provide UL assistance may be based on services. The WTRU may determine whether to provide UL assistance based on the active or inactive services configured for the WTRU.

One aspect used by the WTRU to determine whether to provide UL assistance may be based on a function of BM state. The WTRU may determine whether to provide UL assistance based on the BM state of the WTRU. A WTRU in the first BM state (e.g., BM state A) may not be permitted to perform UL assistance, whereas a WTRU in the second BM state (e.g., BM state B) may be permitted to transmit UL assistance information. The WTRU may perform UL assistance based on the beam relationship, for example, if the DL beam is below a predefined threshold. The predefined threshold may be based on reference signal received power or signal to noise ratio (SINR) metric.

One aspect used by the WTRU to determine whether to provide UL assistance may be based on a function of DRX state. The WTRU may determine whether to provide UL assistance based on the DRX state of the WTRU. For example, a WTRU in a short DRX cycle may not be permitted to perform UL assistance, whereas a WTRU in a long DRX state may be permitted to transmit UL assistance information.

One aspect used by the WTRU to determine whether to provide UL assistance may be based on an explicit WTRU configuration. The WTRU may be explicitly configured or instructed (e.g., via control information in an RRC message or a DL DCI message) by the network to perform UL assistance.

One aspect used by the WTRU to determine whether to provide UL assistance may be based on an UL resource configuration. The WTRU may implicitly determine whether to transmit UL assistance information based on an availability of a valid UL resource configuration. The resources may be WTRU specific, cell specific, or area specific.

One aspect used by the WTRU to determine whether to provide UL assistance may be based on WTRU capability. The WTRU may determine to transmit UL assistance if the WTRU is capable of or using RX/TX beamforming reception/transmission of control and/or data transmissions.

One aspect used by the WTRU to determine whether to provide UL assistance may be based on geographical location. The WTRU may determine to transmit UL assistance if the WTRU is within a pre-defined geographical area (e.g., within a beam, cell, RAN area, or a tracking area). The WTRU may determine to transmit UL assistance if the WTRU changes a pre-defined geographical area (e.g. change in a beam, cell, RAN area, or a tracking area).

One aspect used by the WTRU to determine whether to provide UL assistance may be based on access control. The WTRU may verify if the access control allows for UL assistance transmissions.

One aspect used by the WTRU to determine whether to provide UL assistance may be based on historical rate of beam change. A WTRU with recent/frequent beam changes may transmit UL assistance more frequently (e.g., every DRX cycle).

One aspect used by the WTRU to determine whether to provide UL assistance may be based on beam correspondence. The WTRU may transmit UL assistance if the WTRU determines that beam correspondence is applicable (e.g., beam reciprocity).

Different UL assistance signals from the WTRU may be configured and/or activated by different mechanisms. The WTRU may be configured with a beam occupancy signal, a cell occupancy signal, and/or an area occupancy signal based on broadcast signaling or based on characteristics of the DL signal. The WTRU may be configured with a beam acquisition signal or an interest notification signal based on an explicit WTRU configuration for a specific WTRU state. For example, the WTRU may be configured to transmit a beam acquisition signal or an interest notification signal when in connected and/or inactive state.

The WTRU may be configured to perform UL assistance transmissions on the UL resources based on UL resource configuration/availability and WTRU timing advance status. For example, the WTRU may perform UL assistance transmission using a UL reference signal resource if the resource is configured and if the WTRU has a valid timing advance. Additionally or alternatively, the WTRU may perform UL assistance transmission using a random access resource if such a resource is configured or available.

The WTRU may be configured to perform UL assistance based on the beam relationship to the network (e.g., a base station). For example, in one case, the WTRU has a valid UL beam relationship to the network, the WTRU may transmit using a subset of UL beams. In another case, the WTRU may perform UL assistance via beam sweep if no valid UL beam relationship exists with the network. In still another case, the WTRU may perform UL assistance via non-beamformed transmissions if the WTRU is not capable of TX beamforming and/or if no valid UL beam relationship exists with the network.

The WTRU may be configured to transmit a heartbeat signal based on one or more of predefined criteria, where the heartbeat signal may be UL reference signal or a preamble transmission. The heartbeat signal may be used as a keep alive signal that indicates the presence of specific WTRU.

The WTRU may be configured to transmit a heartbeat signal if the WTRU stays within a preconfigured DL TX beam. The WTRU may be configured to transmit a heartbeat signal if the WTRU stays within a preconfigured set of TRP or cells. The WTRU may be configured to transmit a heartbeat signal if the WTRU stays within a geographical location. The heartbeat signal transmissions may be beneficial to allow the network to transmit DL notifications to a subset of beams, cells, and/or geographical locations. The WTRU may stop transmitting the heartbeat signal if it enters a high activity state or when the WTRU leaves the preconfigured beams, TRPs, cells, and/or geographical area. The WTRU may be configured with dedicated UL resources to transmit the heartbeat signal and the WTRU may receive the configuration information from an RRC message or a DL DCI message.

The WTRU may be configured to transmit a beam occupancy signal based on one or more of predefined criteria, where the beam occupancy signal may be UL reference signal or a preamble transmission. The beam occupancy signal may indicate a presence of any WTRU in a specific beam. For example, the WTRU may be configured to transmit a beam occupancy signal based on a beam relationship with the network (e.g., a base station). The WTRU may be configured with a predefined mapping between beam occupancy signal resource and a specific to a DL TX beam from the network. Beam occupancy signals may be specific to a beam and/or a TRP and may not carry a WTRU specific identification. The WTRU may receive configuration information for the beam occupancy signal from a broadcast message, such as in system information, or based on a property associated with the DL TX beam. For example, the WTRU may determine the best DL TX beam from the network. The WTRU may select a beam occupancy signal resource associated with the selected DL TX beam.

The WTRU may be dynamically configured to transmit a beam occupancy signal based on reception of one or more DL signals. The WTRU may be implicitly indicated by the presence or characteristics of a downlink reference signal and/or downlink sync signal to determine whether to transmit beam occupancy signal.

The above schemes may also be extended to TRP occupancy, cell occupancy, and/or area occupancy signal and may be applied in a system without beamforming. The transmissions may be beneficial to allow the network to determine a presence of WTRUs and to transmit DL notifications to a subset of beams, cells, and/or geographical locations.

A WTRU may be configured to transmit a group identity signal during the WTRU assistance phase. The WTRU may determine a group identity based on the WTRU identity associated with the WTRU state (e.g., connected, inactive, idle state, etc.). The WTRU identity associated with the idle state may be a NAS level identity like SAE-Temporary Mobile Subscriber Identity (S-TMSI). The WTRU identity associated with the inactive state may be a WTRU context identity. The WTRU identity associated with the connected state may be a Cell Radio Network Temporary Identifier (CRNTI).

The WTRU may determine the group identity from the WTRU identity via a hashing function, by one or more most significant bits (MSBs) from the WTRU identity, or based on an explicit mapping function. The WTRU may be configured with the mapping rule in a broadcast message. The WTRU may determine UL resources based on the above mentioned group identity. The WTRU may receive configuration for UL group identity signal resources associated with a group identity in a broadcast message. The group assistance signal may enable the network to identity the presence of WTRUs at a group level granularity and allow reduction of downlink notification if the notification is associated with a WTRU in one of the detected groups. For beamformed UL resources, the group identity may allow the network to determine the presence of specific WTRUs groups within a beam and reduce the downlink notification further.

The WTRU, at or prior to the start of the network reachability/schedulability phase, may transmit one or a set of beam acquisition signals or beam tracking signals to re-acquire the best control channel beam prior to the monitoring control channel during the active period. The beam tracking signal may take one or more of the following forms. The beam tracking signal may be a reference signal specific to the WTRU (e.g., containing the WTRU ID). The beam tracking signal may be a reference signal that may be transmitted in a dedicated UL resource for the WTRU. The beam tracking signal may be a reference signal that may be transmitted in a shared resource configured by the network for multiple WTRUs. The WTRU may transmit the beam acquisition signal based on predefined criteria (e.g., if there is a change in DL TX beam relationship as compared to the previous DRX cycle).

The WTRU may be configured to receive a downlink query signal containing the group identity. The WTRU may determine the group identity similar to the methods described above with respect to the group identity signal transmission. The WTRU may search for its own group identity in the downlink query message. If a matching group identity is present, the WTRU may then transmit an interest notification signal. The resources for UL interest notification signal may be preconfigured and/or activated based on the reception of a downlink query signal. This procedure may reduce the overhead due to paging transmission, as the downlink query may be a short message with few bits indicating group identity and the network can limit the paging transmission only in the beams/cells/TRPs that received the interest notification signal.

Upon transmission of UL interest notification signal, the WTRU may monitor for a DL paging message and/or DL scheduling message at a predefined time offset calculated from either the downlink query signal or the UL interest notification signal. The WTRU may be dynamically configured to receive an interest notification signal. The WTRU may be prepared to receive either an interest notification signal or a downlink paging signal at the paging occasion.

Figure 9:
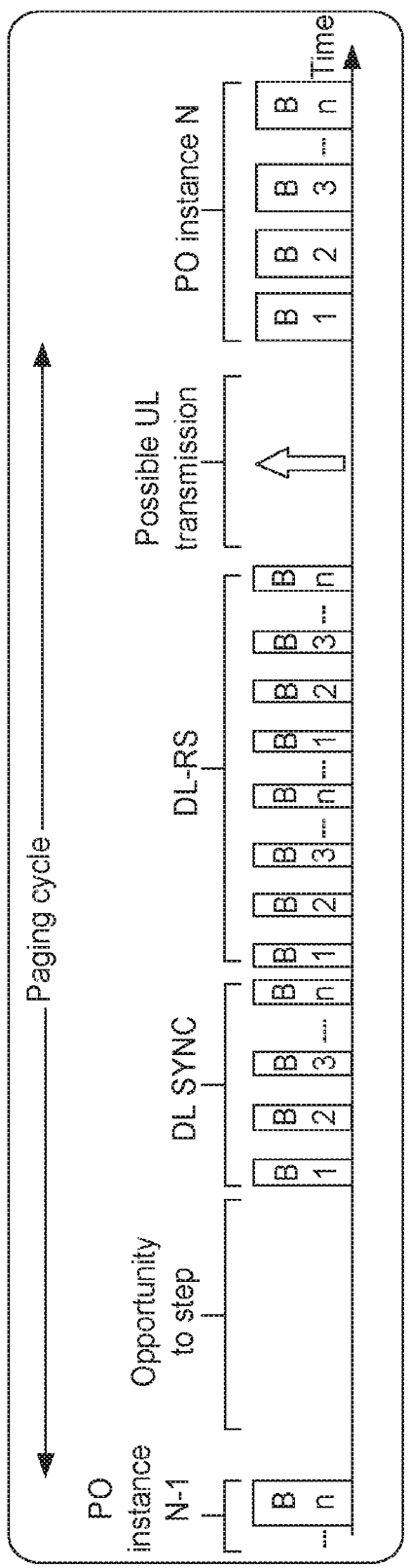
FIG. 9 shows an example timeline of a paging cycle according to one or more embodiments.

The WTRU may be configured for a combination of the one or more assistance methods as described above. For example, FIG. 9 shows an example timeline of a paging cycle according to one or more embodiments. Here, the illustrated paging cycle is used when the WTRU wakes up to read a paging in a paging occasion (PO) instant in a beam formed system. The paging messages are transmitted by the network over multiple n beams.

Between PO instances, the network may transmit DL synchronization (sync) signals and DL reference signals (RSs). Similar to the PO instances, the DL sync signals and the DL RSs may be transmitted by the network over multiple n beams. There may also be an opportunity for the WTRU to sleep and an opportunity to transmit one or more UL transmissions. During the opportunity to transmit one or more UL transmissions, the WTRU may transmit an uplink signal that enables the network to determine which beam to use during the next PO instant. He, the UL transmission may include one or more of the following: beam occupancy signals, group identity signals, beam acquisition signals, and/or interest notification signals, which have been described above.

Thus, a WTRU may be configured to transmit beam management signals (e.g. beam occupancy signals, group identity signals, beam acquisition signals, and/or interest notification signals) as a function of a WTRU state and/or a configuration of UL resources, during an assistance phase of a DRX cycle.

The WTRU may determine at least one DRX configuration aspect (e.g. paging occasion, pre-wakeup time, etc.) as a function of beam relationship with the network (e.g., based on beam measurement). The WTRU may determine the beam relationship based on measurements of DL-sync and/or DL-RS transmissions on different beams. For example, the paging occasion may be specific for a beam and the WTRU may determine the paging occasion based on the best DL beam.

The WTRU may transmit, during an assistance phase of a DRX cycle, beam management signals (e.g., beam occupancy signals, group identity signals, beam acquisition signals, and/or interest notification signals) whose characteristics are determined from preconfigured rules and on beam relationship. Such assistance information may be used to deliver the paging message in the beam suitable for a WTRU and avoid transmission of paging messages in beams not relevant for a WTRU.

A WTRU, upon wakeup, may implicitly or explicitly indicate the beam on which a wakeup indication was received.

The WTRU may be configured to monitor and/or receive downlink notification/paging/scheduling at a time unit that is determined based on the beam relationship with the network. The WTRU may be configured with the scheduling of different beams in a paging occasion. For example, there may be mapping between different DL TX beams and time units (e.g., mini-slots, slots, subframes, frames, etc.). The WTRU may obtain the configuration based on one or more of the following parameters: based on explicit configuration in SIB; based on implicit configuration based on beam ID; based on whether the beams are intra-TRP or inter-TRP; and based on the control channel associated with the beam.

The WTRU may monitor more than one paging occasion associated with one or more beams in a paging cycle. Similarly, the WTRU may monitor the downlink schedule in more than one beam during an on-duration of a DRX cycle. The WTRU may determine which beams to monitor during the network reachability phase based on the measurements performed during synchronization and measurement phase and/or during the WTRU assistance phase.

The WTRU response to the paging message may implicitly/explicitly indicate the beam and/or TRP ID from which WTRU received the paging message. The WTRU may transmit the paging response on an UL beam relationship established based on the WTRU assistance procedure.

It is further to be noted that methods disclosed in the specification or in the claims may be implemented by a device having means for performing each of the respective acts of these methods.

Further, it is to be understood that the disclosure of multiple acts or functions disclosed in the specification or claims may not be construed as to be within the specific order. Therefore, the disclosure of multiple acts or functions will not limit these to a particular order unless such acts or functions are not interchangeable for technical reasons. Furthermore, in some embodiments a single act may include or may be broken into multiple sub acts. Such sub acts may be included and part of the disclosure of this single act unless explicitly excluded.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include computer-readable storage media.

Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU), the method comprising:
   receiving information indicating a configuration of downlink reference signals;
   performing a first measurement on at least one downlink reference signal according to a first measurement period;
   determining whether the first measurement on the at least one downlink reference signal is greater than a threshold value; and
   performing a second measurement according to a second measurement period on a condition that the first measurement is determined to be greater than the threshold value.

2. The method of claim 1, wherein the downlink reference signals correspond to downlink control channel beams.

3. The method of claim 1, wherein the downlink reference signals are channel state information references signals (CSI-RS) or synchronization signal reference signals.

4. The method of claim 1, wherein the second measurement period is a lower activity level than the first measurement period.

5. The method of claim 1, wherein the second measurement period is associated with power savings.

6. The method of claim 1, wherein the second measurement period has a longer time period than a time period of the first measurement period.

7. The method of claim 1, further comprising:
   performing the second measurement according to the first measurement period on a condition that the first measurement is determined to be less than the threshold value.

8. The method of claim 1, wherein the second measurement is associated with beam management.

9. The method of claim 1, wherein the threshold value is pre-determined.

10. The method of claim 1, further comprising:
    receiving information that indicates the threshold value.

11. A wireless transmit/receive unit (WTRU) comprising:
    a transceiver; and
    a processor, wherein:
    the transceiver is configured to receive information indicating a configuration of downlink reference signals;

the processor is configured to perform a first measurement on at least one downlink reference signal according to a first measurement period;

the processor is further configured to determine whether the first measurement on the at least one downlink reference signal is greater than a threshold value; and the processor is further configured to perform a second measurement according to a second measurement period on a condition that the first measurement is determined to be greater than the threshold value.

12. The WTRU of claim 11, wherein the downlink reference signals correspond to downlink control channel beams.

13. The WTRU of claim 11, wherein the downlink reference signals are channel state information references signals (CSI-RS) or synchronization signal reference signals.

14. The WTRU of claim 11, wherein the second measurement period is a lower activity level than the first measurement period.

15. The WTRU of claim 11, wherein the second measurement period is associated with power savings.

16. The WTRU of claim 11, wherein the second measurement period has a longer time period than a time period of the first measurement period.

17. The WTRU of claim 11, wherein the processor is further configured to perform the second measurement according to the first measurement period on a condition that the first measurement is determined to be less than the threshold value.

18. The WTRU of claim 11, wherein the second measurement is associated with beam management.

19. The WTRU of claim 11, wherein the threshold value is pre-determined.

20. The WTRU of claim 11, wherein the transceiver is further configured to receive information that indicates the threshold value.

* * * * *